United States Patent
Kempf et al.

(10) Patent No.: US 11,475,018 B2
(45) Date of Patent: Oct. 18, 2022

(54) DETERMINING USER AND DATA RECORD RELATIONSHIPS BASED ON VECTOR SPACE EMBEDDINGS

(71) Applicant: salesforce.com, inc., San Francisco, CA (US)

(72) Inventors: Guillaume Kempf, San Francisco, CA (US); Jacob Alexander Mannix, Bellevue, WA (US); Arvind Srikantan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 56 days.

(21) Appl. No.: 16/749,540

(22) Filed: Jan. 22, 2020

(65) Prior Publication Data

US 2021/0224284 A1      Jul. 22, 2021

(51) Int. Cl.
| | |
|---|---|
| *G06F 16/2457* | (2019.01) |
| *G06F 16/22* | (2019.01) |
| *G06F 16/2452* | (2019.01) |
| *G06F 16/28* | (2019.01) |

(52) U.S. Cl.
CPC .... *G06F 16/24575* (2019.01); *G06F 16/2237* (2019.01); *G06F 16/24524* (2019.01); *G06F 16/24573* (2019.01); *G06F 16/284* (2019.01)

(58) Field of Classification Search
CPC ......... G06F 16/24575; G06F 16/24573; G06F 16/284; G06F 16/24524; G06F 16/2237
USPC ....................................................... 707/737
See application file for complete search history.

(56) References Cited

U.S. PATENT DOCUMENTS

| | | | |
|---|---|---|---|
| 10,489,425 B2 | 11/2019 | Kempf | |
| 2002/0003575 A1* | 1/2002 | Marchese | G08B 13/19673 348/E7.086 |
| 2004/0054784 A1* | 3/2004 | Busch | G06F 16/958 709/224 |
| 2006/0224597 A1* | 10/2006 | Fitzpatrick | G06F 21/60 |
| 2013/0110764 A1* | 5/2013 | Wilf | G06F 16/283 707/600 |
| 2013/0262294 A1* | 10/2013 | Green | G06Q 20/023 705/39 |
| 2017/0262445 A1* | 9/2017 | Jeon | H04L 67/306 |
| 2018/0157663 A1* | 6/2018 | Kapoor | G06Q 50/01 |
| 2020/0201915 A1* | 6/2020 | Pathak | G06N 3/084 |

* cited by examiner

*Primary Examiner* — Kuen S Lu
(74) *Attorney, Agent, or Firm* — Holland & Hart LLP

(57) ABSTRACT

Methods, systems, and devices supporting determining user and data record relationships based on vector space embeddings are described. Some database systems may receive data record access indications corresponding to data records accessed by users. A database system may generate, based on the data record access indications, user sessions for the users, data record sessions for the data records, or a combination for users and data records. For example, a user session may correspond to a respective user and include a record identifier associated with each data record accessed by the user. The system may generate, in a vector space, vectors from the sessions using an embedding operation, where each vector corresponds to a respective user or data record. The system may determine relationships between the users, data records, or both based on the vectors and may transmit an indication of at least one data record based on the relationships.

20 Claims, 13 Drawing Sheets

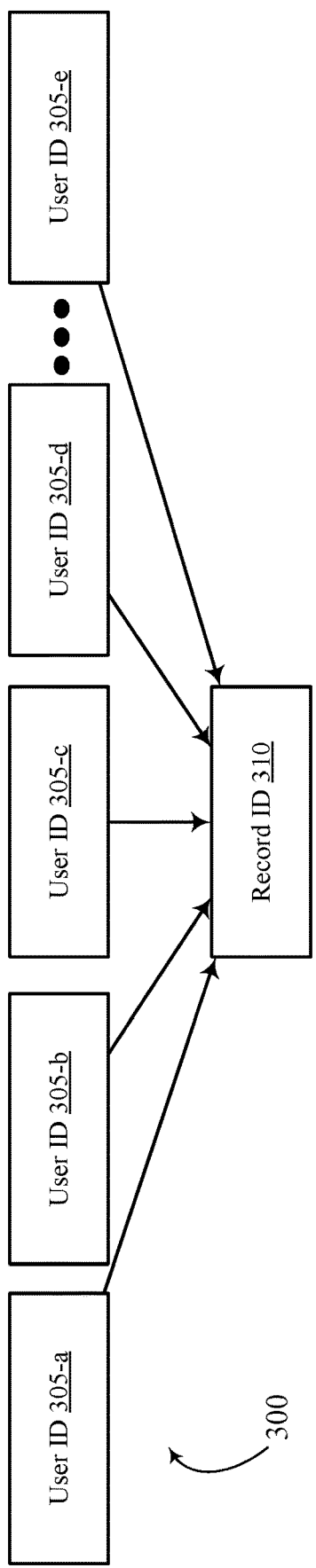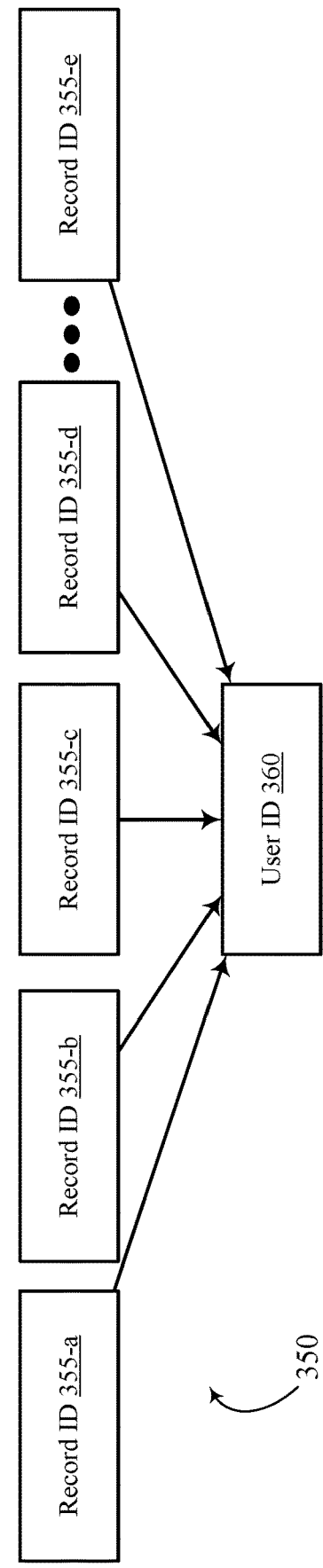

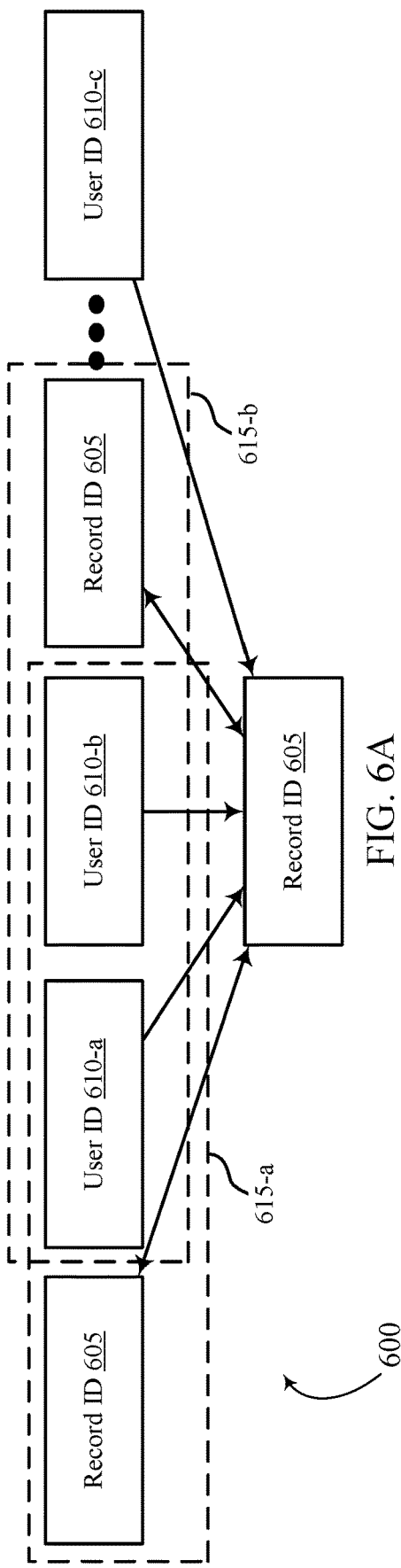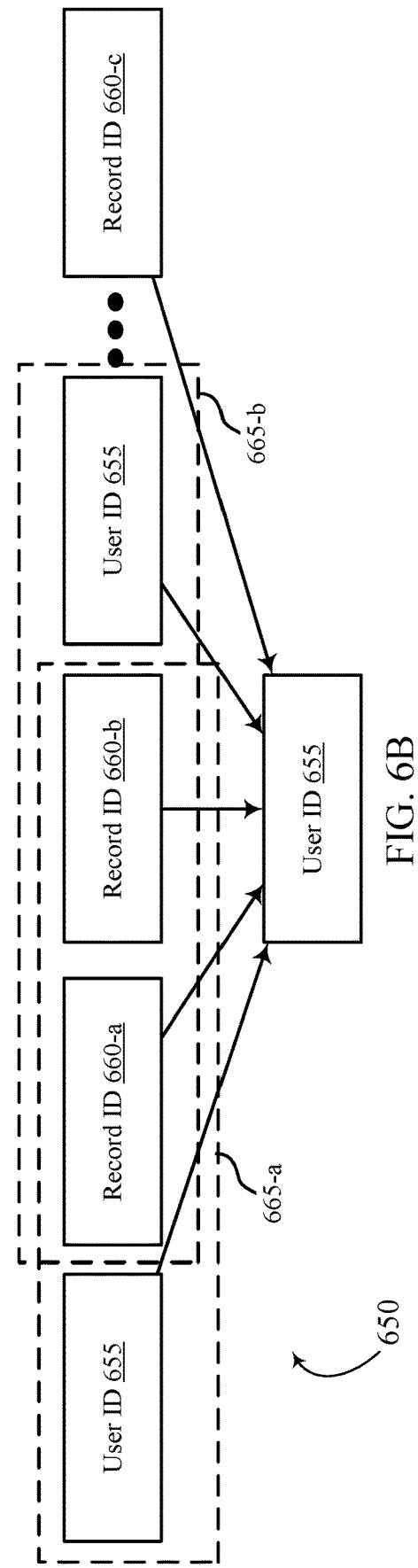

DETERMINING USER AND DATA RECORD RELATIONSHIPS BASED ON VECTOR SPACE EMBEDDINGS

FIELD OF TECHNOLOGY

The present disclosure relates generally to database systems and data processing, and more specifically to determining user and data record relationships based on vector space embeddings.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Users interacting with a CRM platform may access many of the same documents, contacts, data, and additional data objects. In some systems, the CRM platform and users may benefit from identifying notions of a "team" or "close colleagues" within the CRM platform to facilitate improving access to common data records and communication between the users. However, relying on users to create custom data objects to track such "teams" may result in inconsistencies based on different users implementing different levels of security, dynamic changes within teams, and organizations not implementing clearly defined teams. Furthermore, using collected metadata or domain knowledge to determine the "team" or "close colleagues" may exclude users that are relevant to the desired team, may involve significant implementation and configuration complexity, and may be based on the storage of substantial amounts of data. This data storage may include metadata and other types of data that introduce security concerns for an organization.

BRIEF DESCRIPTION OF THE DRAWINGS

FIG. 3A illustrates an example of a record session that supports determining user and data record relationships based on vector space embeddings in accordance with aspects of the present disclosure.

FIG. 3B illustrates an example of a user session that supports determining user and data record relationships based on vector space embeddings in accordance with aspects of the present disclosure.

FIG. 6A illustrates an example of a merged record session that supports determining user and data record relationships based on vector space embeddings in accordance with aspects of the present disclosure.

FIG. 6B illustrates an example of a merged user session that supports determining user and data record relationships based on vector space embeddings in accordance with aspects of the present disclosure.

DETAILED DESCRIPTION

Figure 1:
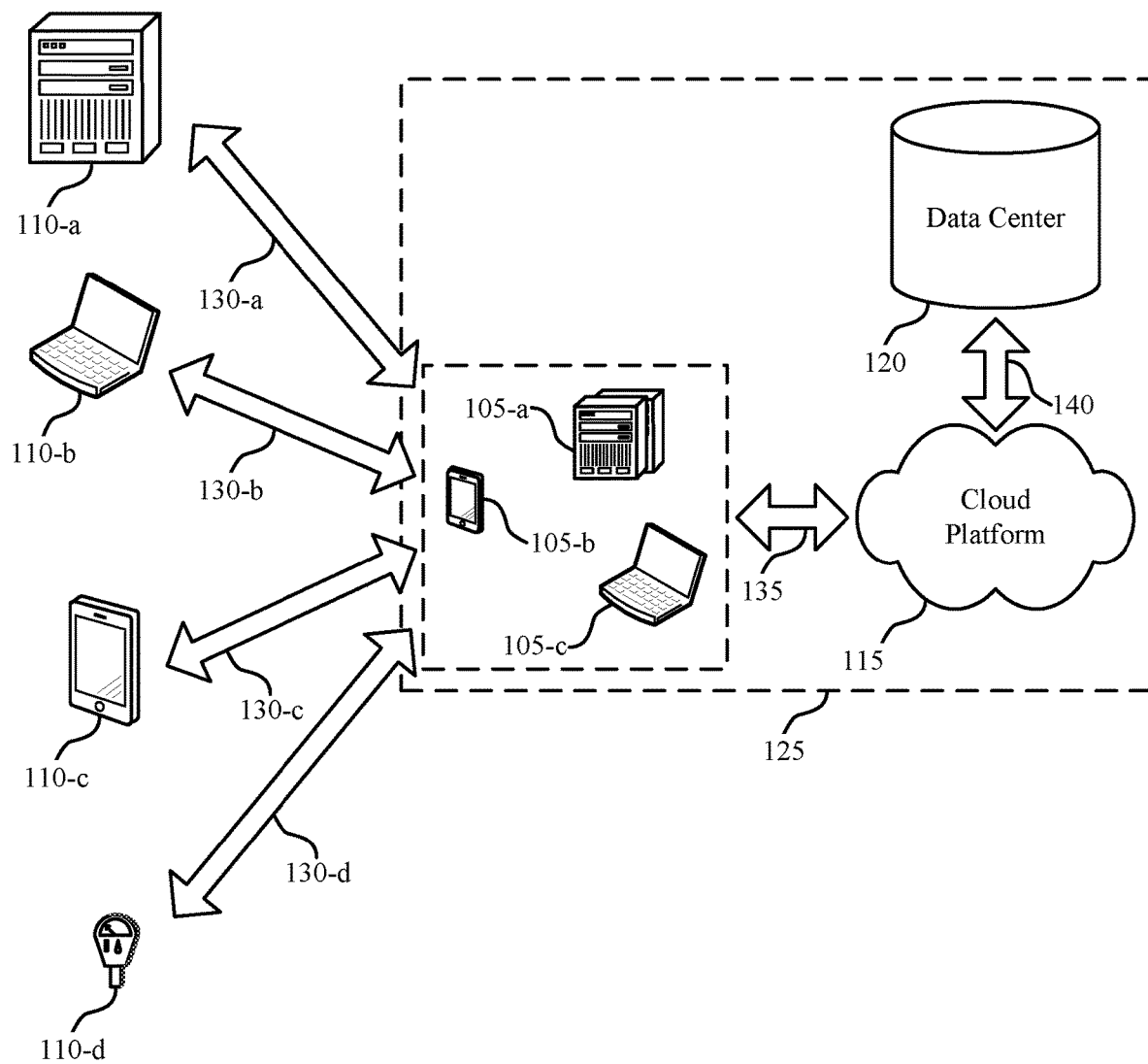
FIGS. 1 and 2 illustrate examples of systems for data analysis that support determining user and data record relationships based on vector space embeddings in accordance with aspects of the present disclosure.

In order to provide relevant relationships between data records and users, a data analytics platform may rely on the users of the platform to define relationships among the users, data records, or both supported by the platform or associated databases. These relationships may include "teams," "close colleagues," or related data records. In some cases, the platform may rely on the collection of metadata or domain knowledge to determine relationships between the users or the data records. These relationships may be valuable for users as the relationships may facilitate more efficient inter-team cooperation, rapid discovery of relevant data records, or analysis of users and the data records. However, user-defined relationships may not be inclusive of the actual relationships between the users, the data records, or a combination of the two, and may not fully capture the relationships within the data analytics platform. This incomplete relationship information may result in inaccurate and/or out of date relationship definitions within the platform. Additionally, storage of the metadata or domain knowledge information may result in storage space constraints and data privacy issues associated with the collected data.

Some systems, such as customer relationship management (CRM) systems or other data management systems, may store a number of data records as well as data related to one or more users. For example, a database system may store a number of data records related to sales records, or other relevant data. Additionally, the database system may store user names, user identifiers (IDs) associated with the users, and timestamps associated with access of specific data records by the users. In some cases, such data may be difficult to use for efficiently determining relationships without collection of additional metadata or domain knowledge associated with the users or the data records. Techniques described herein may enable a user to access and utilize flexible and dynamic user and data record relationships to more efficiently and effectively perform their job function without the need for a system that requires user-generated definitions or that stores and maintains substantial metadata or domain knowledge.

In accordance with aspects of the present disclosure, to efficiently generate user and data record relationships, a database system may determine user and data record relationships based on vector space embeddings. The system may receive one or more data record access indications that correspond to data records that have been accessed by users. Based on the data record access indications, the system may generate user sessions for each of the users. Each of the user sessions may correspond to a respective user and may include a record identifier that is associated with each of the data records that the user accessed. In some examples, the system may generate data record sessions for each of the data records. Each of the data record sessions may correspond to a respective data record and may include a user identifier associated with each user that accessed the data record. In some other examples, the system may generate sessions for the data records and the users, and the generated sessions may correspond to a respective user—including a record identifier associated with each of the data records accessed by the user—or a respective data record—including a user identifier associated with each user that accessed the data record.

The system may generate, in a vector space, vectors for the users from the user sessions using an embedding operation, and each of the generated vectors may correspond to a respective user. In some examples, the system may generate, in a second vector space, second vectors for the data records from the data record sessions using an embedding operation, and each of the generated second vectors may correspond to a respective data record. In some other examples, if the system has generated a combined set of sessions for users and data records, the system may generate a total set of vectors in a combined vector space for users and data records.

Once the vectors have been generated using the embedding operations, the system may determine relationships between the users based on the vectors. In some examples, the system may determine additional relationships between the data records based on vectors corresponding to data records. The relationships may correspond to teams, close colleagues, related data records, or any combination of these or other relationships between users, data records, or both. The system may transmit an indication of at least one data record based on the determined relationships between the users, the data records, or both. For example, the system may use the determined relationships to improve search rankings, augment lists of most recently used data records, provide recommendations or quick links to users, or perform any combination of these functions.

Aspects of the disclosure are initially described in the context of an environment supporting an on-demand database service. Aspects of the disclosure are further described with respect to a database system, user sessions, record sessions, user embeddings, vector mappings, and flow diagrams. Aspects of the disclosure are further illustrated by and described with reference to apparatus diagrams, system diagrams, and flowcharts that relate to determining user and data record relationships based on vector space embeddings.

FIG. 1 illustrates an example of a system 100 for data analysis that supports determining user and data record relationships based on vector space embeddings in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-$a$), a smartphone (e.g., cloud client 105-$b$), or a laptop (e.g., cloud client 105-$c$). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to specific applications, data, and database information within cloud platform 115 based on the associated security or permission level, and the cloud client 105 may not have access to others.

Contacts 110 may interact with the cloud client 105 in person or via phone, email, web, text messages, mail, or any other appropriate form of interaction (e.g., interactions 130-$a$, 130-$b$, 130-$c$, and 130-$d$). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-$a$), a laptop (e.g., contact 110-$b$), a smartphone (e.g., contact 110-$c$), or a sensor (e.g., contact 110-$d$). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the system 100 may support an application for determining user and data record relationships based on vector space embeddings. The user and data record relationship application may leverage collected data record access indications received by the data center 120, the cloud platform 115, or both to generate user sessions, data record sessions, or both. The user sessions and data record sessions may allow the data center 120, the cloud platform 115, or both to generate user embeddings and record embeddings for one or more users and data records. The user and data record relationship application may define a vector space using the user embeddings, the data record embeddings, or both, and may determine relationships between the users, the data records, or both based on the vectors embedded in the vector space.

In other systems, software packages may be used for determining relationships between users of a CRM platform. However, these software packages often rely on the users of the software package to manually define relationships among the users or data records supported by the CRM platform or associated databases, where these relationships may include "teams," "close colleagues," or related data records. These user-defined relationships may not be inclusive of the actual relationships between the users, the data records, or a combination of the two and may not fully capture the relationships, resulting in inaccurate and/or out of date relationship definitions within the platform. Additionally or alternatively, these packages may rely on the collection of metadata or domain knowledge in order to determine relationships between the users, the data records, or both, which may result in significant storage overhead and data privacy issues associated with collecting the data.

In contrast, the system 100 may utilize data record access indications (e.g., already tracked or managed by the system 100) to support a flexible and dynamic user and data record relationship determination application. For example, because the relationships between the users, data records, or both are based on vector space embeddings generated from user and data record sessions, the relationships between the users and the data records may be continuously and accurately updated to reflect the real-time relationships between the users and the data records. Additionally, the system 100 may mitigate storage overhead for data supporting the application, as the data record access indications may be stored at the system 100 for other uses (e.g., auditing, historical logs, etc.) and may be reused to determine the vector space embeddings.

In some cases, the system 100 may support improving search results for the users based on determined relationships between the users and the data records. The system 100 may improve the relevancy of search rankings and data record suggestions to a user by leveraging the determined relationships. For example, the system 100 may "boost" rankings of data records most recently accessed by colleagues of the user that are determined to have a close relationship with the searching user or of data records accessed by colleagues determined to be part of the same team as the searching user. The system 100 may additionally or alternatively support generating quick access options for users to access data records determined to be most relevant to the user based on the determined relationships between the users and the data records. Furthermore, the system 100 may determine these relationships between the data records and the users without collecting additional metadata or other data that may implicate security or data privacy concerns associated with the access and storage of such additional metadata or other data.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
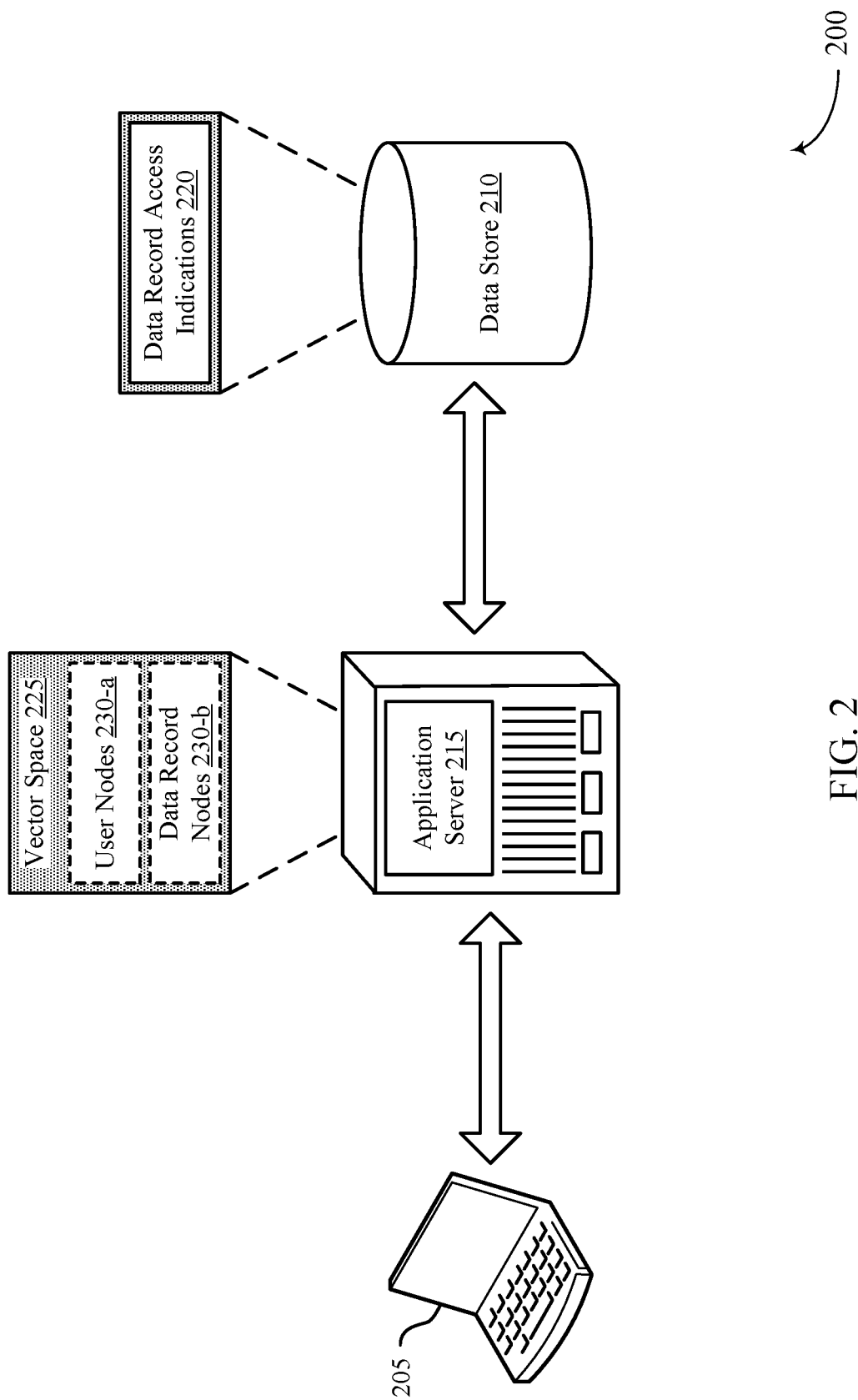

FIG. 2 illustrates an example of a system 200 for data analysis that supports determining user and data record relationships based on vector space embeddings in accordance with aspects of the present disclosure. The system 200, which may be an example of a system for data processing, includes a user device 205, a data store 210, and an application server 215. The system 200 may implement aspects of the system 100 as described with reference to FIG. 1. For example, the application server 215 may be an example or component of a cloud client 105 (e.g., a server), a cloud platform 115, a data center 120, or some combination thereof. The application server 215 may be an example of a single server, a server cluster, a database server, a cloud-based server, a virtual machine, a container, or any other device or system that supports data processing. Additionally, the user device 205 may be an example of a cloud client 105 or contact 110, and the data store 210 may implement aspects of one or more of the data center 120 or cloud platform 115 as described with reference to FIG. 1, for example.

The application server 215 may be an example of an analytics platform for determining user and data record relationships based on vector space embeddings. The application server 215 may retrieve, visualize, or analyze data from the data store 210. For example, the application server 215 may be connected with the data store 210 and support a fully-automated and packaged framework that unlocks customer data sources for the application server 215 to utilize. In some examples, the data store 210 may reside in a customer's data center or on a system for which there is not an existing connector available for the application server 215. The data store 210 may be an example or component of a multi-tenant database system, in which the application server 215 may determine relationships between users for a particular tenant.

In some cases, the data store 210 may store a set of data record access indications 220 tracking which users access which data records at what times. The application server 215 may retrieve this stored information for analysis (e.g., periodically, aperiodically, based on one or more triggers, etc.). In some other cases, the application server 215 may be in communication with one or more user devices 205 and may facilitate access by the user devices 205 of data records stored within the data store 210. Each access of a data record by the user device 205 may be logged by the application server 215 and stored in the data store 210 as a data record access indication 220. Each of the data record access indications 220 stored in the data store 210 may include a username associated with the user accessing the data record, a user ID associated with the username, and a timestamp associated with a time the data record was accessed by the user.

The application server 215 may utilize data record access indications 220 stored in the data store 210 that are associated with specific data records and users to support a flexible and dynamic user and data record relationship determination application. For example, the application server 215 may use the data record access indications 220 to define sessions for each user, data record, or both corresponding to a particular organization (e.g., a particular tenant of a multi-tenant database system). The application server 215 may generate vector embeddings for one or more of each user, data record, or both based at least in part on one or more of the defined sessions for each user, data record, or both in a vector space 225. For example, the application server 215 may determine user nodes 230-a in a user vector space 225, data record nodes 230-b in a data record vector space 225, or both user nodes 230-a and data record nodes 230-b in a combined vector space 225. The application server 215 may derive the relationships between the users, data records, or both based on the distance between nodes within the vector space 225. For example, user nodes 230-a that are less than a threshold distance apart in the vector space 225 may correspond to closely related users (e.g., users in a team, close colleagues, users that commonly access similar data records, etc.). The application server 215 may determine related users, data records, or both on-the-fly (e.g., based on the defined vector space 225) or may store indications of the related users, data records, or both in a local memory cache or in the data store 210 based on an analysis of the vector space 225 and may update these stored indications periodically or aperiodically based on new data record access indications 220.

Additionally, the application server 215 may support augmenting search results for the users based on determined relationships between the users and the data records stored in the data store 210. The application server 215 may improve the relevancy of search rankings and data record suggestions to a user by leveraging the determined relationships. For example, the application server 215 may "boost" rankings of data records most recently accessed by colleagues of the user that are determined to have a close relationship with the searching user or of data records accessed by colleagues determined to be part of the same team as the searching user. The application server 215 may send the modified rankings of data records for display in a user interface of the user device 205. The application server 215 may additionally or alternatively support generating quick access options for users to access data records determined to be most relevant to the user based on the determined relationships between the users and the data records. Furthermore, the application server 215 may determine these relationships between the data records and the users without collecting metadata or other data that may implicate security or data privacy concerns associated with the access and storage of such data.

FIG. 3A illustrates an example of a record session 300 that supports determining user and data record relationships based on vector space embeddings in accordance with aspects of the present disclosure. The record session 300 (e.g., a data record session, which may be an example of a data schema) may correspond to a particular data record with record ID 310 and may include an array of values or data fields (e.g., from one or more data object types). In this example, the values may correspond to a number of user IDs 305. FIG. 3A further illustrates how the user IDs 305 may be linked to the record ID 310 to form the record session 300. It is to be understand that the record session 300, as illustrated in FIG. 3A and described herein, is one example record session 300 that may support determining user and data record relationships based on vector space embeddings, and many other data models—with additional or alternative values, data object types, connections, or some combination thereof—may support determining user and data record relationships based on vector space embeddings as described herein.

The user IDs 305 are associated with users that have accessed a data record associated with the record ID 310. More specifically, as illustrated in FIG. 3A, the user ID 305 associated with each user that accessed the data record associated with the record ID 310 is included as part of the record session 300 (e.g., for a particular time window). For example, for the record session 300, the user IDs 305 associated with the users that accessed the data record associated with the record ID 310 include user ID 305-a, user ID 305-b, user ID 305-c, user ID 305-d, and user ID 305-e. In some examples, the record session 300 may include a number of timestamps associated with each access of the data record by each user. In some other examples, the user IDs 305 for the record session 300 may be ordered according to the timestamps at which the data record was accessed. If a user accesses a data record multiple times, the corresponding record session 300 may include the user ID 305 for the user multiple times (e.g., ordered based on the timestamps for data record access). In some cases, the data records may be sales records, lead information, or any other type of data object stored by a database system. Accessing a data record may involve a user clicking on a link to view a data record, editing a data record, searching for a data record, or the like.

A database system (e.g., a data center 120, cloud platform 115, or data store 210 as described with reference to FIGS. 1 and 2) or a data processing device (e.g., an application server 215 as described with reference to FIG. 2) may store the record session 300. In some cases, a record session 300 may be automatically generated for each data record stored within the database system. In some other cases, a user may select one or more data records for which to create record sessions 300. In this way, the database system may automatically track interactions with data records and may evaluate links between the data records and specific users based on access of the stored data records or data objects by the users. For example, a record session 300 may be automatically updated for each data record following each access of the data record by a user. This may reduce the latency involved in generating record sessions 300 and may keep the record sessions 300 up-to-date based on the latest data stored in the database system and accessed by one or more users. In other examples, the record session 300 may be updated based on a periodic schedule or an external trigger (e.g., for reduced processing overhead). Additionally, the database system may perform calculations, aggregations, and analysis on the stored data records according to data record access indications received in regard to users accessing the stored data records without exporting any of the data outside the database system (e.g., without exporting a comma-separated values (CSV) file) and without using (e.g., storing) metadata related to the users or the data records. Performing these processes internal to the database system and without using metadata may reduce processing latency, improve system security, and support real-time or pseudo-real-time record session 300 updates.

FIG. 3B illustrates an example of a user session 350 that supports determining user and data record relationships based on vector space embeddings in accordance with aspects of the present disclosure. The user session 350 (e.g., a data schema) may correspond to a particular user with user ID 360 and may include an array of values or data fields (e.g., from one or more data object types). In this example, the values may correspond to a number of record IDs 355. FIG. 3B further illustrates how the record IDs 355 may be linked to the user ID 360 to form the user session 350. It is to be understand that the user session 350, as illustrated in FIG. 3B and described herein, is one example user session 350 that may support determining user and data record relationships based on vector space embeddings, and many other data models—with additional or alternative values, data object types, connections, or some combination thereof—may support determining user and data record relationships based on vector space embeddings as described herein.

The record IDs 355 are associated with data records that have been accessed by a user associated with the user ID 360. More specifically, as illustrated in FIG. 3B, a record ID 355 associated with each record that was accessed by the user associated with the user ID 360 is included as part of the user session 350 (e.g., for a particular time window). For example, for the user session 350, the record IDs 355 associated with the records that were accessed by the user associated with user ID 360 include record ID 355-*a*, record ID 355-*b*, record ID 355-*c*, record ID 355-*d*, and record ID 355-*e*. In some examples, the user session 350 may include a number of timestamps associated with each access of each of the data records associated with the record IDs 355 by the user associated with the user ID 360. In some other examples, the record IDs 355 for the user session 350 may be ordered according to the timestamps at which the data records are accessed. If a user accesses a data record multiple times, the corresponding user session 350 may include the record ID 355 multiple times (e.g., ordered based on the timestamps for data record access). In some cases, the data records may be sales records, lead information, or any other type of data object stored by a database system. Accessing a data record may involve a user clicking on a link to view a data record, editing a data record, searching for a data record, or the like.

A database system (e.g., a data center 120, cloud platform 115, or data store 210 as described with reference to FIGS. 1 and 2) or a data processing device (e.g., an application server 215 as described with reference to FIG. 2) may store the user session 350. In some cases, a user session 350 may be automatically generated for each user ID 360 associated with a user supported by the database system. In some other cases, a user or organization may select one or more users for which to create user sessions 350. In this way, the database system may automatically track user interactions with data records and may evaluate links between the data records and specific users based on access of the stored data records or data objects by the users. For example, a user session 350 may be automatically generated for each user following each access of one or more data records by the user. This may reduce the latency involved in generating user sessions 350 and may keep the user sessions 350 up-to-date based on the latest data stored in the database system and accessed by one or more users. In other examples, the user session 350 may be updated based on a periodic schedule or an external trigger (e.g., for reduced processing overhead). Additionally, the database system may perform calculations, aggregations, or analysis on the stored data records according to data record access indications received in regard to users accessing the stored data records without exporting any of the data outside the database system (e.g., without exporting a CSV file) and without using (e.g., storing) metadata related to the users or the data records. Performing these processes internal to the database system and without using metadata may reduce processing latency, improve system security, and support real-time or pseudo-real-time updates.

Figure 4:
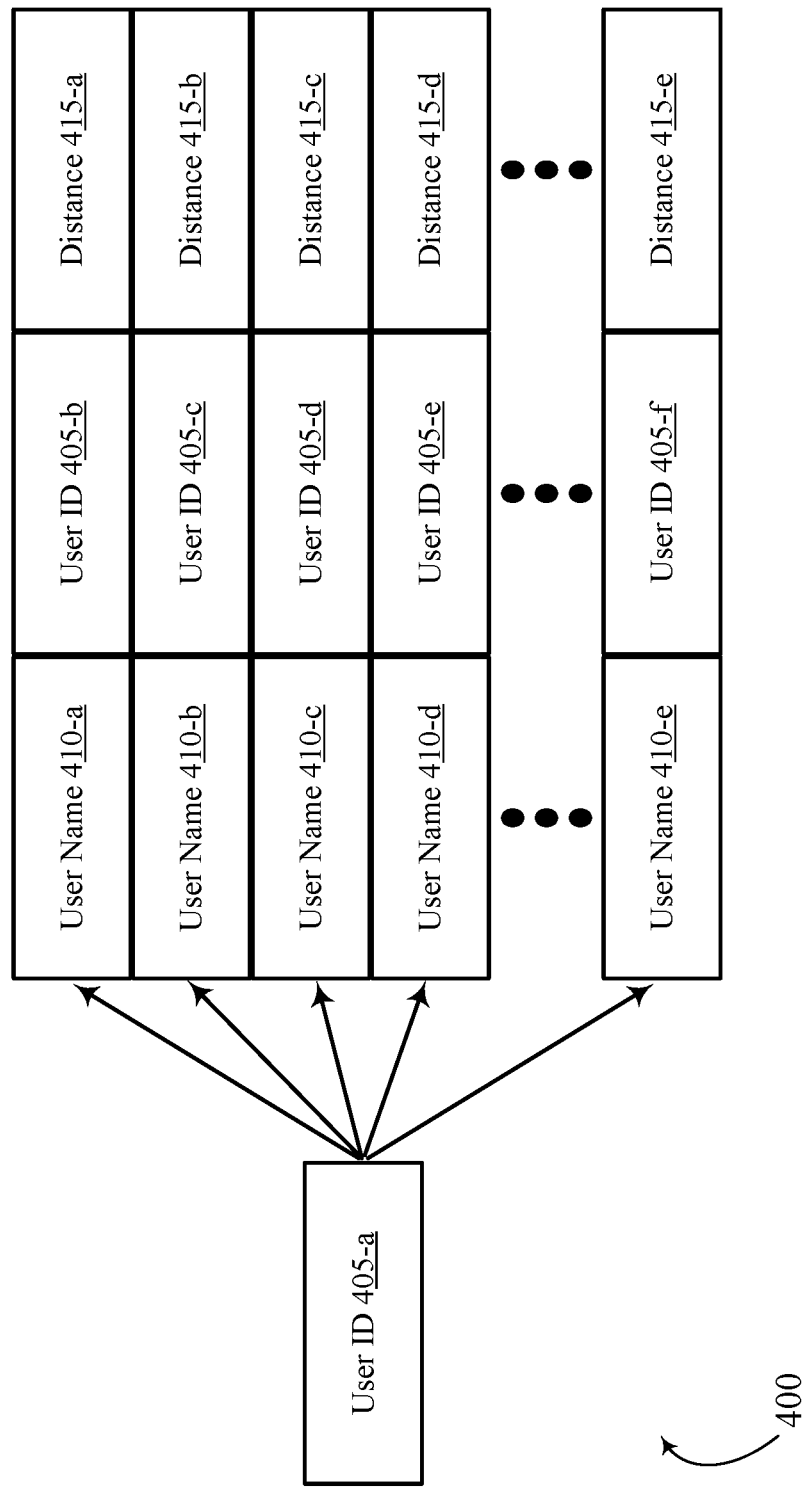
FIG. 4 illustrates an example of a user embedding that supports determining user and data record relationships based on vector space embeddings in accordance with aspects of the present disclosure.

FIG. 4 illustrates an example of a user embedding 400 that supports determining user and data record relationships based on vector space embeddings in accordance with aspects of the present disclosure. The user embedding 400 may be an example of a user embedding generated based on a set of user sessions, such as the user session 350 as described with reference to FIG. 3B. Additionally or alternatively, a database system may support a record embedding using a set of record sessions or a user and record embedding, using at least the set of user sessions and the set of record sessions, in a shared vector space. The user embedding 400, which may be an example of at least a portion of a data analysis system, may be based on a vector space and may support determining relationships between users. In this example, as illustrated, the user embedding 400 may support determining relationships between a first user with a first user ID 405-*a* and a number of other users with user names 410 and additional user IDs 405. The distances 415 between the users in the vector space (e.g., based on the user sessions) may support defining relationships between the users based on a set of rules, a set of thresholds, or a combination thereof.

Specifically, a user ID 405-*a* is associated with a first user. A user name 410-*a*, user ID 405-*b*, and a distance 415-*a* are associated with a second user, where the distance 415-*a* is with respect to the first user in a vector space. A user name 410-*b*, user ID 405-*c*, and a distance 415-*b* are associated with a third user. A user name 410-*c*, a user ID 405-*d*, and a distance 415-*c* are associated with a fourth user. A user name 410-*d*, a user ID 405-*e*, and a distance 415-*d* are associated with a fifth user. A user name 410-*e*, a user ID 405-*f*, and a distance 415-*e* are associated with a sixth user. FIG. 4 further illustrates how the first user with the user ID 405-*a* may be related to each of the second, third, fourth, fifth, and sixth users and their respective user names 410 and user IDs 405 according to the distances 415 in the vector space. It is to be understand that the user embedding 400, as illustrated in FIG. 4 and described herein, is one example user embedding 400 that may support determining user and data record relationships based on vector space embeddings, and many other data models—with additional or alternative data object types, connections, or both—may support determining user and data record relationships based on vector space embeddings as described herein.

In some implementations, a data processing device or system (e.g., an application server 215 as described with reference to FIG. 2) may determine user sessions for each of the first user, the second user, the third user, the fourth user, the fifth user, and the sixth user using the process described with respect to FIG. 3B (or a similar process). The data processing device or system may generate vectors from the user sessions for the users in a vector space. For example, each user session may define an array of values (e.g., record IDs, user IDs, or a combination thereof). The device or system may transform each array of values into a user embedding in a vector space using one or more embedding algorithms, models, or functions, such as Word2Vec, where each user embedding may be generated from a respective user session 350, may correspond to a respective user, and may have a numerical representation. These user embeddings created for the users from the user sessions may define the user vector space. The device or system may calculate the distance 415 between the user embeddings (e.g., the vector representations of the users) in the vector space using any distance calculation function. The distance 415 between user embeddings may correlate to the relatedness of the corresponding users. For example, if distance 415-a is relatively small (e.g., less than a pre-defined or dynamic distance threshold), the device or system may determine that the first user with user ID 405-a and the second user with user ID 405-b are closely correlated (e.g., members of a team, close colleagues, similar users, etc.). However, if distance 415-b is relatively large (e.g., greater than or equal to a pre-defined or dynamic distance threshold), the device or system may determine that the first user with user ID 405-a and the third user with user ID 405-c are not closely correlated.

In some cases, a record embedding operation may be performed on one or more data record sessions (e.g., a data record session 300 as described with reference to FIG. 3A). For example, each data record session may define an array of values (e.g., user IDs, record IDs, or a combination thereof). The device or system may transform each array of values into a data record embedding (e.g., a vector representation of a data record) in a vector space using one or more embedding algorithms, models, or functions, such as Word2Vec, where each data record embedding may be generated from a respective record session 300, may correspond to a respective data record session 300, and may have a numerical representation. These data record embeddings created for the data records from the data record sessions may define a data record vector space or may be included with the user embeddings (e.g., as a total set of vectors) in a shared vector space. Similar to the user embedding 400 described with reference to FIG. 4, the distances between each of the generated vectors associated with one or more of the data records and a vector associated with a specific data record may be represented numerically and may represent relative closeness or distance between each respective data record and the specific data record. In a shared vector space, the device or system may determine relationships between users, data records, or both based on distances between user embeddings, data record embeddings, or both.

Figure 5:
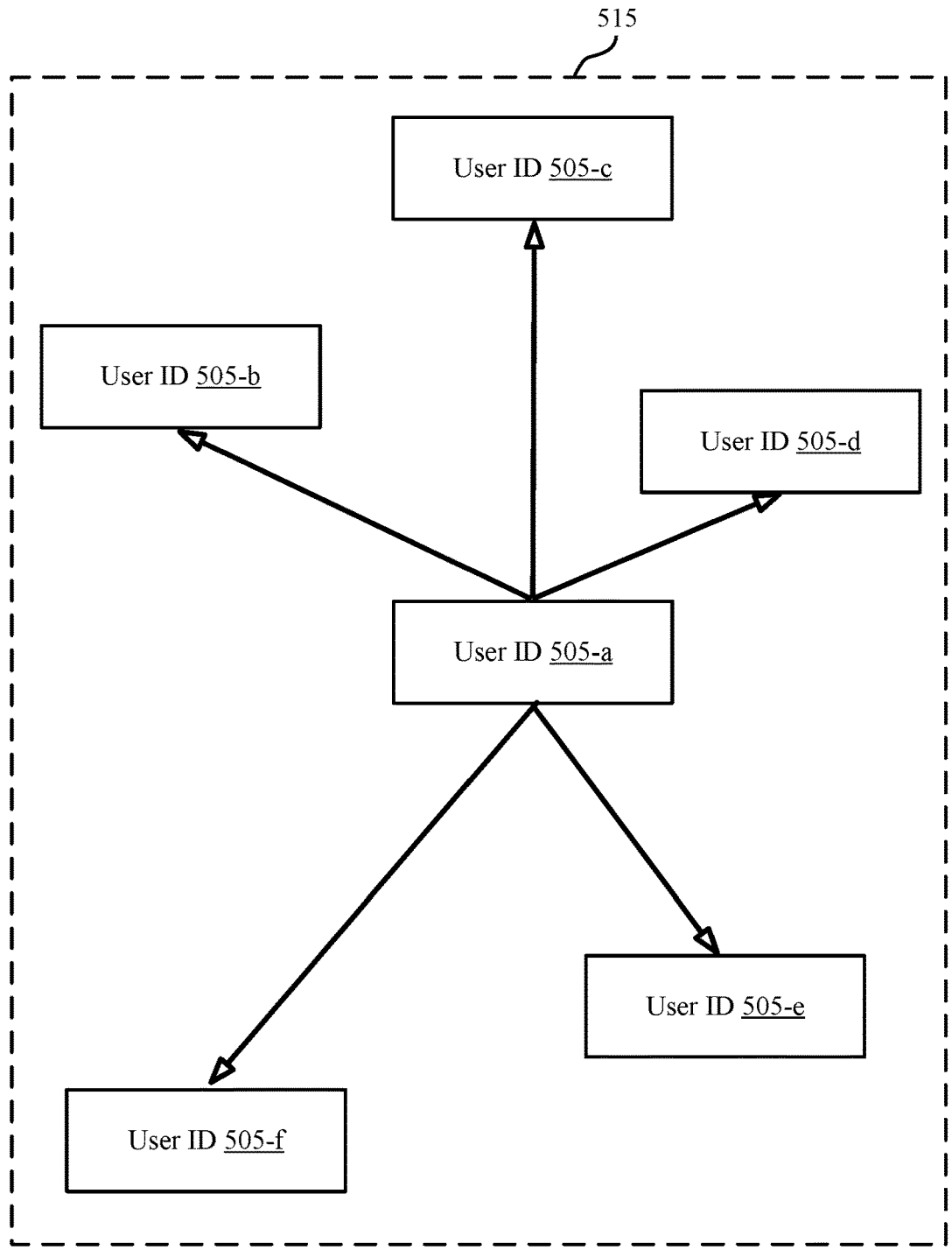
FIG. 5 illustrates an example of vector mapping based on a user embedding that supports determining user and data record relationships based on vector space embeddings in accordance with aspects of the present disclosure.

FIG. 5 illustrates an example of vector mapping 500 based on a user embedding that supports determining user and data record relationships based on vector space embeddings in accordance with aspects of the present disclosure. The vector mapping 500 illustrated in FIG. 5 includes a graphical representation of a number of nodes (e.g., corresponding to the user IDs 505) and edges 510 in a first vector space 515 illustrating relative associations between users corresponding to the user IDs 505. The nodes and edges 510 may be generated by a user embedding (e.g., a user embedding 400 as described with reference to FIG. 4) using the processes described herein. It is to be understood that the vector mapping 500, as illustrated in FIG. 5 and described herein, is one example vector mapping 500 that may support determining user and data record relationships based on vector space embeddings, and many other data models—with additional or alternative data object types, connections, or both—may support determining user and data record relationships based on vector space embeddings as described herein.

As illustrated in FIG. 5, the nodes corresponding to the user IDs 505 are positioned relative to one another within the vector space 515. Each of the user IDs 505 are associated with a user and the positions of the user IDs 505 are determined based on a user embedding in the vector space 515. The vector space 515 may represent distances between each of the users associated with the user IDs 505 using the edges 510. In some cases, the vector space 515 may create edges 510 between nodes that are less than a threshold distance apart and may not create edges 510 between nodes that are greater than or equal to the threshold distance apart. In this way, the vector space may define a user galaxy of connected users, where some users are correlated (e.g., based on edges 510 defined between the nodes for the user IDs 505 of these users) and others are not. The relative distances of each of the user IDs 505 (e.g., user ID 505-b, user ID 505-c, user ID 505-d, user ID 505-e, and user ID 505-f) from the user ID 505-a may be represented numerically, for example as described with respect to FIG. 4.

A system (e.g., a cloud platform 115 or an application server 215 as described with reference to FIGS. 1 and 2) may determine relationships between the one or more users based on the vector mapping 500. For example, a measurement of relative proximity of one or more users may be relevant to determining a relationship between the one or more users. As shown in FIG. 5, the user associated with the user ID 505-d is the smallest distance from the user associated with the user ID 505-a, the user associated with the user ID 505-e is the next smallest distance from the user associated with the user ID 505-a, and so on, with the user associated with the user ID 505-f being the furthest in the first vector space 515 from the user associated with the user ID 505-a. In some cases, the database system may generate the vector mapping 500 and may determine one or more groups of users from amongst the users associated with the user IDs 505 based on the user embeddings (e.g., the generated vectors in the vectors space 515).

In some cases, a second set of vectors may be generated in a second vector space for one or more data records from one or more data record sessions (e.g., a data record sessions 300) using an additional embedding operation (e.g., a same Word2Vec operation, or some other embedding operation). In some such cases, each of the second set of vectors may correspond to a respective data record. Accordingly, as described herein, additional relationships between the one or more data records may be determined based on the second set of vectors generated in the second vector space. In some other cases, a second set of data record vectors for additional data records may be generated in the vector space 515 along with the user vectors. In these cases, the vector space 515 may define user-to-user relationships, record-to-record relationships, and user-to-record relationships. The users, data records, or both included in a vector space 515 may correspond to a single tenant in a multi-tenant system (e.g., such that the vector space 515 does not introduce security concerns between tenants).

In some examples, an indication of the determined one or more groups of users may be stored in a database system (e.g., a data center 120, cloud platform 115, or data store 210 as described with reference to FIGS. 1 and 2). In some other examples, a data processing device or system may determine the user groupings on-the-fly based on a vector space 515. In some cases, the users corresponding to the user IDs 505 may be grouped together based on one or more thresholds (e.g., pre-defined thresholds, semi-static thresholds, dynamic thresholds, etc.) and the distances between the nodes corresponding to the user IDs 505, as defined by the edges 510. In some cases, the thresholds may include one or more of a threshold distance for an edge 510 between users in a group, a threshold number of users in a group, a threshold number of groups, or a combination thereof. Additionally or alternatively, in some examples, the one or more groups of users may be determined based on a grouping of the vectors in the vector space 515.

In some cases, the generated vectors of the vector mapping 500 may be input into a machine learning algorithm (e.g., as raw features). Based on the input vectors (e.g., amongst other inputs), the system may determine a machine-learned algorithm for search ranking. In some such cases, the system may receive a search query, for example via a user device (e.g., a cloud client 105, a contact 110, a user device 205, etc.), and may rank a set of search results in response to the received search query. For example, a ranking of the set of search results may be based on the machine-learned algorithm. An indication of one or more data records (e.g., the search results) may be transmitted in response to the receipt of the search query according to the determined search ranking. This search ranking algorithm may take into account related users, related data records, or both based on the determined one or more vector spaces. For example, if the user submitting the search query is part of a group of users (e.g., a "team" as defined by the vector space 515), the search ranking may boost particular data records in the search ranking algorithm based on other users within the group recently or frequently accessing those data records. Additionally or alternatively, in a shared vector space for users and data records, the search ranking may boost particular data records with vectors that are proximate to (e.g., within a particular distance threshold of) the user's vector in the vector space.

FIG. 6A illustrates an example of a merged record session 600 that supports determining user and data record relationships based on vector space embeddings in accordance with aspects of the present disclosure. The merged record session 600, which may be supported by at least a portion of a data analysis system, may include multiple values retrieved from different data object types. In this example, the data objects (e.g., corresponding to the different data object types) may include data records and users defined in a database system. The merged record session 600 for a data record with a corresponding record ID 605 may include the record ID 605 and a number of user IDs 610 corresponding to users that have accessed the data record. FIG. 6A further illustrates how the user IDs 610 may be merged with a number of occurrences of the record ID 605 within an array and may be linked to the record ID 605 to form the merged record session 600. It is to be understood that the merged record session 600, as illustrated in FIG. 6A and described herein, is one example merged record session 600 that may support determining user and data record relationships based on vector space embeddings, and many other data models—with additional or alternative data object types, connections, or both—may support determining user and data record relationships based on vector space embeddings as described herein.

The user IDs 610 are associated with users that have accessed the data record associated with the record ID 605. More specifically, as illustrated in FIG. 6A, the user ID 610 associated with each user that accessed the data record associated with the record ID 605 (e.g., within a particular time window, such as the last 20 days, or at all) is included as part of the merged record session 600 in an array. Additionally, the record ID 605 is periodically inserted into the array according the size of a window 615. The windows 615 include a first window 615-a, a second window 615-b, and a number of additional windows 615 based on the number of user IDs 610, each of the windows being sized to include three data objects of the array. For example, the first window 615-a includes the record ID 605, a user ID 610-a, and a user ID 610-b. The second window 615-b includes the user ID 610-a, the user ID 610-b, and the record ID 605. A third window 615 could include the user ID 610-b, the record ID 605, and an additional user ID 610 (e.g., a user ID 610 for a user that accessed the data record subsequent to the user corresponding to the user ID 610-b). The record ID 605 may be inserted into the merged record session 600 periodically such that each window 615 includes the record ID 605 once (and, in this case, two user IDs 610). In some examples, the size of the windows 615 may be determined by a window size input received from a user. In some other examples, the size of the windows 615 may be determined based on a vector space associated with the merged record sessions 600, relationships between the one or more users, a pre-defined, semi-static, or dynamic parameter, or any combination thereof.

As illustrated in FIG. 6A, the user IDs 610 associated with the users that accessed the data record associated with the record ID 605 include the user ID 610-a, the user ID 610-b, and the user ID 610-c. In some examples, the merged record session 600 may include a number of timestamps associated with each access by each user of the data record associated with the record ID 605. Additionally or alternatively, the user IDs 610 may be ordered according to the timestamps for data record access (e.g., prior to inserting the periodic record ID 605). In some cases, the data records may be of different data object types, such as sales records, lead information, work items, epics, or any other types of data object stored by a database system.

In some cases, a database system (e.g., a data center 120, cloud platform 115, or data store 210 as described with reference to FIGS. 1 and 2) may store data indicating the merged record session 600. For example, the database system may store the merged record session 600, an embedding (e.g., vector) for the record associated with the record ID 605 based on the merged record session 600, distances between users, records, or both based on the embedding, or grouping information based on the distances. In some cases, a merged record session 600 may be automatically generated for each data record stored within the database system. In this way, the database system may automatically track interactions with each data record and may evaluate links between the data records and specific users based on interactions with the stored data records or data objects by the users. For example, a merged record session 600 may be automatically updated for a data record following each access of the data record by a user. This may reduce the latency involved in generating merged record sessions 600 and may keep the merged record sessions 600 up-to-date based on the latest data stored in the database system and accessed by one or more users. Additionally or alternatively, the use of a merged record session 600 may facilitate embedding and mapping of both users and data records into a shared vector space to facilitate determining additional relationships.

FIG. 6B illustrates an example of a merged user session 650 that supports determining user and data record relationships based on vector space embeddings in accordance with aspects of the present disclosure. The merged user session 650, which may be supported by at least a portion of a data analysis system, may include multiple values retrieved from different data object types. In this example, the data objects (e.g., corresponding to the different data object types) may include users and data records defined in a database system. The merged user session 650 for a user with a corresponding user ID 655 may include the user ID 655 and a number of record IDs 660 corresponding to the data records accessed by the user. FIG. 6B further illustrates how the record IDs 660 may be merged with a number of occurrences of the user ID 655 within an array and may be linked to the user ID 655 to form the merged user sessions 650. It is to be understood that the merged user session 650, as illustrated in FIG. 6A and described herein, is one example merged user session 650 that may support determining user and data record relationships based on vector space embeddings, and many other data models—with additional or alternative data object types, connections, or both—may support determining user and data record relationships based on vector space embeddings as described herein.

The record IDs 660 are associated with data records that have been accessed by a user associated with the user ID 655. More specifically, as illustrated in FIG. 6B, the record ID 660 associated with a data record that was accessed by a user associated with the user ID 655 is included as part of the merged user session 650 in an array. Additionally, the user ID 655 is periodically inserted into the array according to the size of a window 665. The windows 665 include a first window 665-a, a second window 665-b, and any number of additional windows 665 based on the number of record IDs 660, each of the windows being sized to include three data objects of the array. For example, the first window 665-a includes the user ID 655, a record ID 660-a, and a record ID 660-b. The second window 665-b includes the record ID 660-a, the record ID 660-b, and the user ID 655. A third window 665 could include the record ID 660-b, the user ID 655, and an additional record ID 660 (e.g., a record ID 660 for a data record accessed by the user subsequent to the data record corresponding to the record ID 660-b). The user ID 655 may be inserted into the merged user session 650 periodically such that each window 665 includes the user ID 655 once (and, in this case, two record IDs 660). In some examples, the size of the windows 665 may be determined by a window size input received from a user. In some other examples, the size of the windows 665 may be determined based on a vector space associated with the merged user sessions 650, relationships between the one or more users, a pre-defined, semi-static, or dynamic parameter, or any combination thereof.

A database system (e.g., a data center 120, cloud platform 115, or data store 210 as described with reference to FIGS. 1 and 2) may store data indicating the merged user session 650. For example, the database system may store the merged user session 650, an embedding (e.g., vector) for the user associated with the user ID 655 based on the merged user session 650, distances between users, records, or both based on the embedding, or grouping information based on the distances. In some cases, a merged user session 650 may be automatically generated for each user tracked within the database system (e.g., for a particular tenant in a multi-tenant database system). In this way, the database system may automatically track interactions with each data record and may evaluate links between the data records and specific users based on access logs for the stored data records or data objects by the users. For example, a merged user session 650 may be automatically generated for each user and may be updated periodically, based on one or more triggers, or after the user accesses a data record. This may reduce the latency involved in generating merged user session 650 and may keep the merged user session 650 up-to-date based on the latest data interactions in the database system. Additionally, the use of a merged user session 650 may facilitate embedding and mapping of both users and data records into a shared vector space to facilitate determining additional relationships.

Using the merged record sessions 600 and the merged user sessions 650, a data processing device or system may map both users and data records into a shared vector space. For example, periodically inserting the user ID or record ID according to a window may weight the mapping such that each user embedding is near data record embeddings for data records frequently accessed by that user and each data record embedding is near user embeddings for users that frequently access that data record. As such, a system may determine the users most closely related to a particular user and the data records most closely related to the particular user from a single vector space. From this information, the system may determine "teams" of users, frequently accessed data records or data object types of a user or a team of users, or any other relationships between users, data records, or some combination thereof.

The determined relationships may be used to improve the functionality of a CRM platform or the user experience of users accessing the CRM platform. For example, a user device may cache most recently used data records for the CRM platform in a local memory cache. The user device may access these data records with reduced latency based on caching the data records locally, as opposed to retrieving the data records from a database over a network. However, the CRM platform may improve the caching process by locally caching data records most recently used by any user in a team of users, as opposed to a specific user. For example, the CRM platform may determine that a user belongs to a team of users according to a vector mapping process. If any user in the team of users accesses a data record, the CRM platform may push the data record to the local memory cache of user devices for all of the users in the team. As other users in the same team may be likely to access this same data record, the CRM platform may improve the latency involved in data record retrieval for the team of users based on the determined user and data record relationships. Additionally or alternatively, the CRM platform may implement an algorithm to combine most recently used data records by the user and most recently used data records by close colleagues to determine the data records to cache, where the algorithm may apply different weights to the user and the user's colleagues.

Furthermore, by mapping the user and data record embeddings into a single, shared vector space, the CRM platform may determine data records most related to a particular user or group of users. The CRM platform may generate a set of user-specific quick links for accessing data records. These quick links may be displayed in a user interface of a user device and the data records for these quick links may be locally cached at the user device for low latency retrieval. As such, the quick links may reduce the time spent by a user querying for this information. Additionally, the quick links may support any number of data object types. By using the embeddings, rather than simply counting the data records most frequently accessed by a single user, the system may determine the quick links by taking into account how data records correspond to full teams of users, rather than just a single user. This may provide more helpful quick links and an improved user experience.

Additionally or alternatively, the database system may perform calculations, aggregations, or analysis on the merged record sessions 600, the merged user sessions 650, or both (e.g., based on record embeddings, user embeddings, or both) without exporting any of the data outside the database system (e.g., without exporting a CSV file) and without using (e.g., storing) metadata related to the users or the data records. Performing these processes internal to the database system and without storage of additional metadata may reduce processing latency, improve system security, and support real-time or pseudo-real-time updates. Accordingly, the database system may determine how users of the system are connected to each other and to data records and how data records are connected to each other and to users without users inputting metadata or domain knowledge to define these connections.

Figure 7:
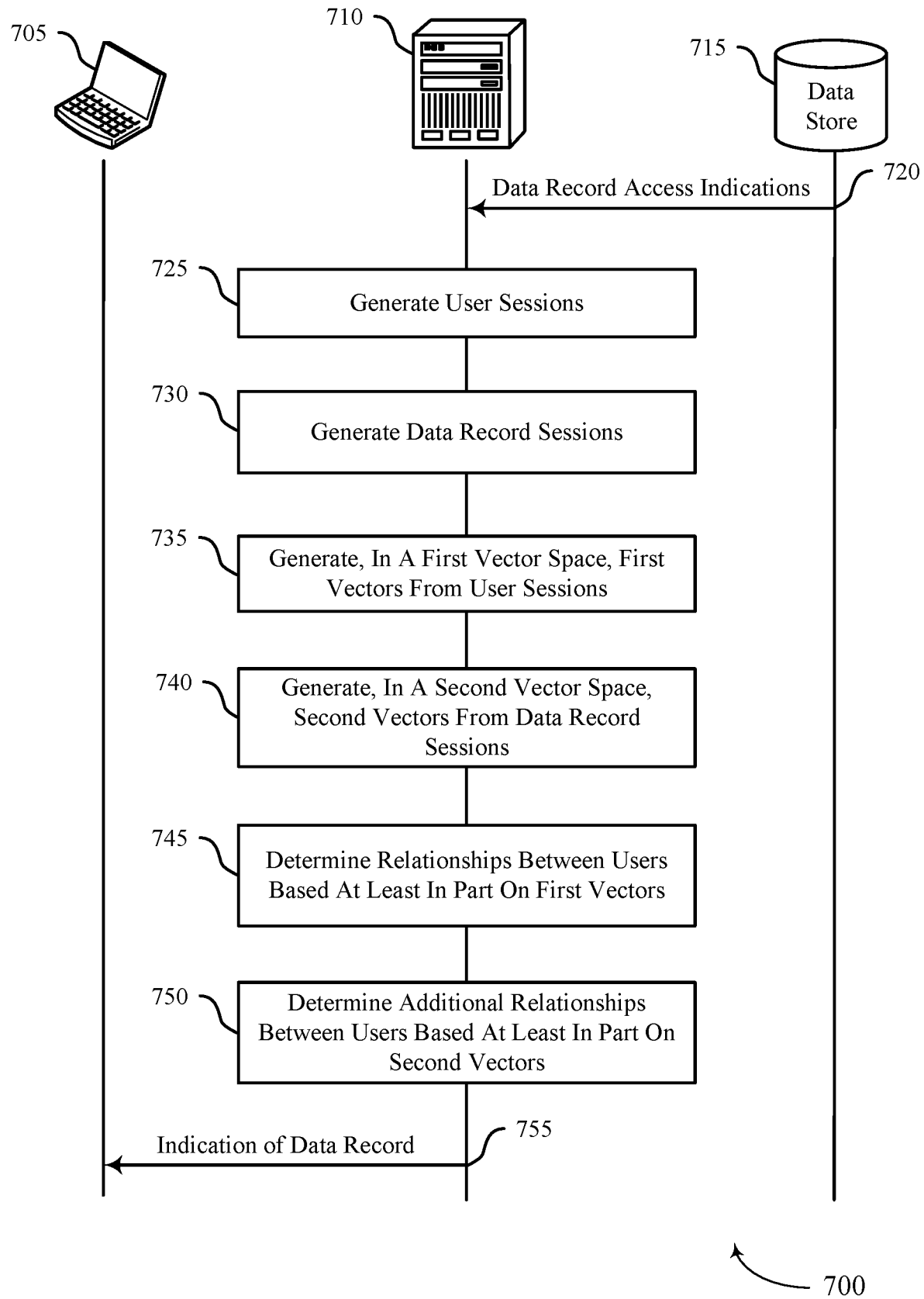
FIG. 7 illustrates an example of a process flow that supports determining user and data record relationships based on vector space embeddings in accordance with aspects of the present disclosure.

FIG. 7 illustrates an example of a process flow 700 that supports determining user and data record relationships based on vector space embeddings in accordance with aspects of the present disclosure. The process flow 700 may support functionality or features of a user and data record relationship determination application based on vector space embeddings. For example, the user and data record relationship determination application may be built on top of a data management system (e.g., including a data store 715) and may leverage one or more user sessions, record sessions, user embeddings, record embeddings, merged user sessions, merged record sessions, or any combination thereof implemented at the data store 715, an application server 710, or both. The user and data record relationship determination application may run at the application server 710 (e.g., a single server, a server cluster, a database server, a cloud-based server, a virtual machine, a container, or any other system or device for data processing). In some cases, the functionality described herein with reference to the application may be performed locally at a user device 705, in the data store 715, or at a combination of these entities. Alternative examples of the following may be implemented, where some steps are performed in a different order than described or are not performed at all. In some cases, steps may include additional features not mentioned below, or further steps may be added.

The data store 715, the application server 710, or both may be components of a database system. At 720, the application server 710 may receive one or more data record access indications from the data store 715. The one or more received data record access indications may correspond to a set of data records accessed by one or more users. In some cases, the application server 710 may retrieve, from the data store 715, a subset of the total set of data record access indications stored in the data store 715 (e.g., the data record access indications for a particular time period, such as the previous 20 days). The retrieved subset may be based on one or more of a threshold number of data record access indications for the subset, a threshold access time for the subset, or a combination thereof. Each data record access indication may include a timestamp, a user ID, and a record ID, where the data record access indication indicates that a user (corresponding to the user ID) accessed a data record (corresponding to the record ID) at a particular time (indicated by the timestamp).

At 725, the application server 710 may generate, based on the one or more data record access indications, one or more user sessions for the one or more users. Each of the one or more user sessions may correspond to a respective user of the one or more users. Additionally, each of the one or more user sessions may include a record identifier associated with each data record accessed by the respective user. In some cases, the application server 710 may order each record identifier in each user session according to a timestamp at which the associated data record is accessed by the respective user.

At 730, the application server 710 may additionally or alternatively generate, based on the one or more data record access indications, one or more data record sessions for the one or more data records. Each of the one or more data record sessions may correspond to a respective data record of the one or more data records. Additionally, each of the one or more data record sessions may include a user identifier associated with each of the one or more users that accessed the respective data record.

Additionally, in some cases the application server 710 may generate a first session of the one or more sessions corresponding to a first user. In such cases, the application server 710 may generate the first session by generating a first array including each record identifier associated with each data record accessed by the first user. Further, in some such cases, the application server 710 may periodically insert a user identifier of the first user into the first array according to a window size. In some cases, the application server 710 may also generate a second session of the one or more sessions corresponding to a first data record by generating a second array that includes each user identifier associated with each user that has accessed the first data record. Further, in some such cases, the application server 710 may periodically insert a data record identifier of the first data record into the second array according to a window size (e.g., the same window size or a different window size). In some cases, the application server 710 or the data store 715 may receive a user input indicating the window size. In additional examples, the window size may be dynamically determined based on a user vector space, a data record vector space, a shared vector space, the relationships between the set of users, an embedding algorithm, or a combination thereof.

At 735, the application server 710 may generate, in a first vector space, a first number of vectors from the one or more user sessions using an embedding operation. Each of the vectors of the first number of vectors may correspond to a respective user of the one or more users. In some cases, the application server 710 may generate, in the first vector space, the first number of vectors for the one or more user sessions using the embedding operation. In such cases, each of the vectors of the first number of vectors may correspond to a respective user session of the one or more user sessions.

At 740, the application server 710 may generate, in a second vector space or in the first vector space, a second number of vectors from the one or more data record sessions using an additional embedding operation. Each of the vectors of the second number of vectors may correspond to a respective data record of the one or more data records. For example, in some cases, the application server 710 may generate, in the first vector space, one or more total vectors from the one or more sessions using the embedding operation, where each vector of the one or more total vectors may correspond to a respective plurality of users or data records (e.g., either a user or a data record) of the plurality of user and the plurality of data records. In some cases, the application server 710 may generate, in the second vector space or in the first vector space, the second number of vectors for the one or more data record sessions using the additional embedding operation. In such cases, each of the vectors of the second number of vectors may correspond to a respective data record session of the one or more data record sessions.

At 745, the application server 710 may determine relationships between the one or more users based on the first number of vectors (e.g., the user vectors). In some cases, the application server 710 may determine one or more groups of users from the one or more users based on the one or more vectors and may store, in the data store 715, an indication of the one or more groups of users. In some cases, determining the one or more groups of users may include grouping vectors of the one or more vectors based on a threshold distance between vectors in a group, a threshold number of users in the group, a threshold number of groups, or a combination thereof. In some such cases, the one or more groups of users may be determined based on the grouping of the vectors of the one or more vectors.

At 750, the application server 710 may determine additional relationships between the one or more data records based on the second number of vectors (e.g., the record vectors). In some cases, the application server 710 may determine the relationships or the additional relationships based on information stored in a database for a set of user identifiers that correspond to the one or more users.

In some cases, the application server 710 may push, for storage in a local memory cache of a user device 705 operated by a first user of the one or more users in a determined group of users, a set of most recently used data records for the first user. In some such cases, the user device 705 or the application server 710 may identify a data record accessed by a second user of the group of users. Further, in some examples, the application server 710 may update the set of most recently used data records for the first user that is stored in the local memory cache of the user device 705 with the identified data record based on the first user and the second user being part of the group of users.

At 755, the application server 710 may transmit an indication of at least one data record based on the determined relationships between the one or more users. In some cases, the application server 710 may transmit, for display in a user interface of a user device 705 operated by a user of the one or more users, an indication of a set of data records for quick access by the user. This indication may be based on a set of vectors corresponding to the set of data records nearest to a vector corresponding to the user in the vector space.

In some cases, the application server 710 may receive, via the user device 705, a search query from a first user of the one or more users. A group of users of the one or more groups of users may include the first user. The application server 710 may rank, in response to the search query, a set of search results. Additionally, in some such cases, the application server 710 may modify the ranking of the set of search results based on data records accessed by a second user of the group of users. In such cases, transmitting the indication of the at least one data record may be in response to the search query and may be further based on the modified ranking.

In some examples, the application server 710 may input the set of vectors into a machine learning algorithm (e.g., as raw features). The application server 710 may determine a machine-learned algorithm for search ranking based on the input set of vectors. In some cases, the application server 710 may receive a search query from one or more users via one or more user devices 705. In such cases, the application server 710 may rank, in response to the received search query, a set of search results based on the machine-learned algorithm for search ranking (e.g., a search algorithm). Further, in such cases, transmitting the indication of the at least one data record may be in response to the search query and may be further based on the ranking of the set of search results.

Figure 8:
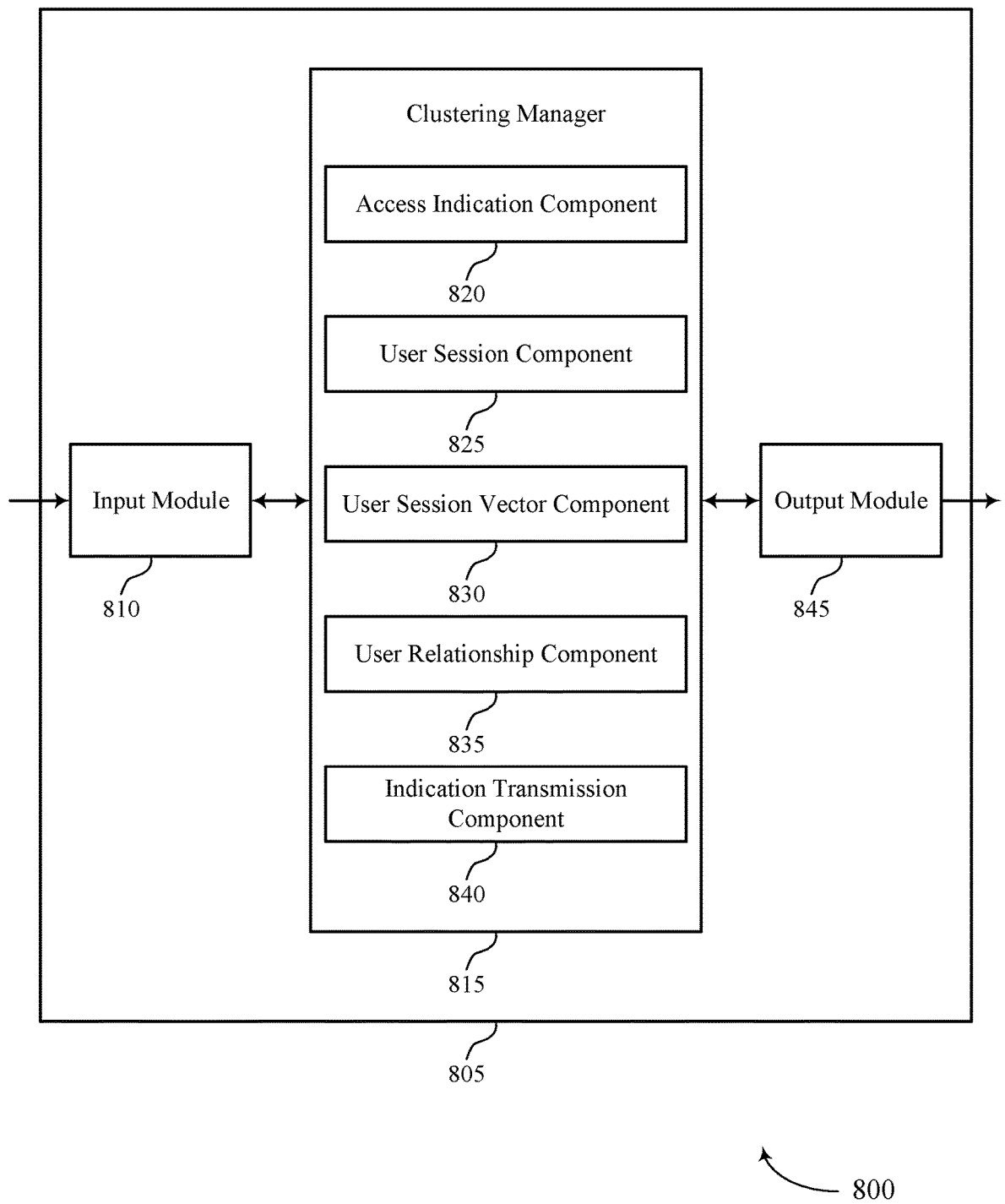
FIG. 8 shows a block diagram of an apparatus that supports determining user and data record relationships based on vector space embeddings in accordance with aspects of the present disclosure.

FIG. 8 shows a block diagram 800 of an apparatus 805 that supports determining user and data record relationships based on vector space embeddings in accordance with aspects of the present disclosure. The apparatus 805 may include an input module 810, a clustering manager 815, and an output module 845. The apparatus 805 may also include a processor. Each of these components may be in communication with one another (e.g., via one or more buses). In some cases, the apparatus 805 may be an example of a user terminal, a database server, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the clustering manager 815 to support determining user and data record relationships. In some cases, the input module 810 may be a component of an input/output (I/O) controller 1015 as described with reference to FIG. 10.

The clustering manager 815 may include an access indication component 820, a user session component 825, a user session vector component 830, a user relationship component 835, and an indication transmission component 840. The clustering manager 815 may be an example of aspects of the clustering manager 905 or 1010 described with reference to FIGS. 9 and 10.

The clustering manager 815 or at least some of its various sub-components may be implemented in hardware, software executed by a processor, firmware, or any combination thereof. If implemented in software executed by a processor, the functions of the clustering manager 815 or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The clustering manager 815 or at least some of its various sub-components may be physically located at various positions, including being distributed such that portions of functions are implemented at different physical locations by one or more physical devices. In some examples, the clustering manager 815 or at least some of its various sub-components may be a separate and distinct component in accordance with various aspects of the present disclosure. In other examples, the clustering manager 815 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The access indication component 820 may receive a set of data record access indications corresponding to a set of data records accessed by a set of users. The user session component 825 may generate, based on the set of data record access indications, a set of user sessions for the set of users, where each user session corresponds to a respective user of the set of users and includes a record identifier associated with each data record accessed by the respective user. The user session vector component 830 may generate, in a vector space, a set of vectors from the set of user sessions using an embedding operation, where each vector of the set of vectors corresponds to a respective user of the set of users. The user relationship component 835 may determine relationships between the set of users based on the set of vectors. The indication transmission component 840 may transmit an indication of at least one data record based on the determined relationships between the set of users.

The output module 845 may manage output signals for the apparatus 805. For example, the output module 845 may receive signals from other components of the apparatus 805, such as the clustering manager 815, and may transmit these signals to other components or devices. In some specific examples, the output module 845 may transmit output signals for display in a user interface, for storage in a database or data store, for further processing at a server or server cluster, or for any other processes at any number of devices or systems. In some cases, the output module 845 may be a component of an I/O controller 1015 as described with reference to FIG. 10.

Figure 9:
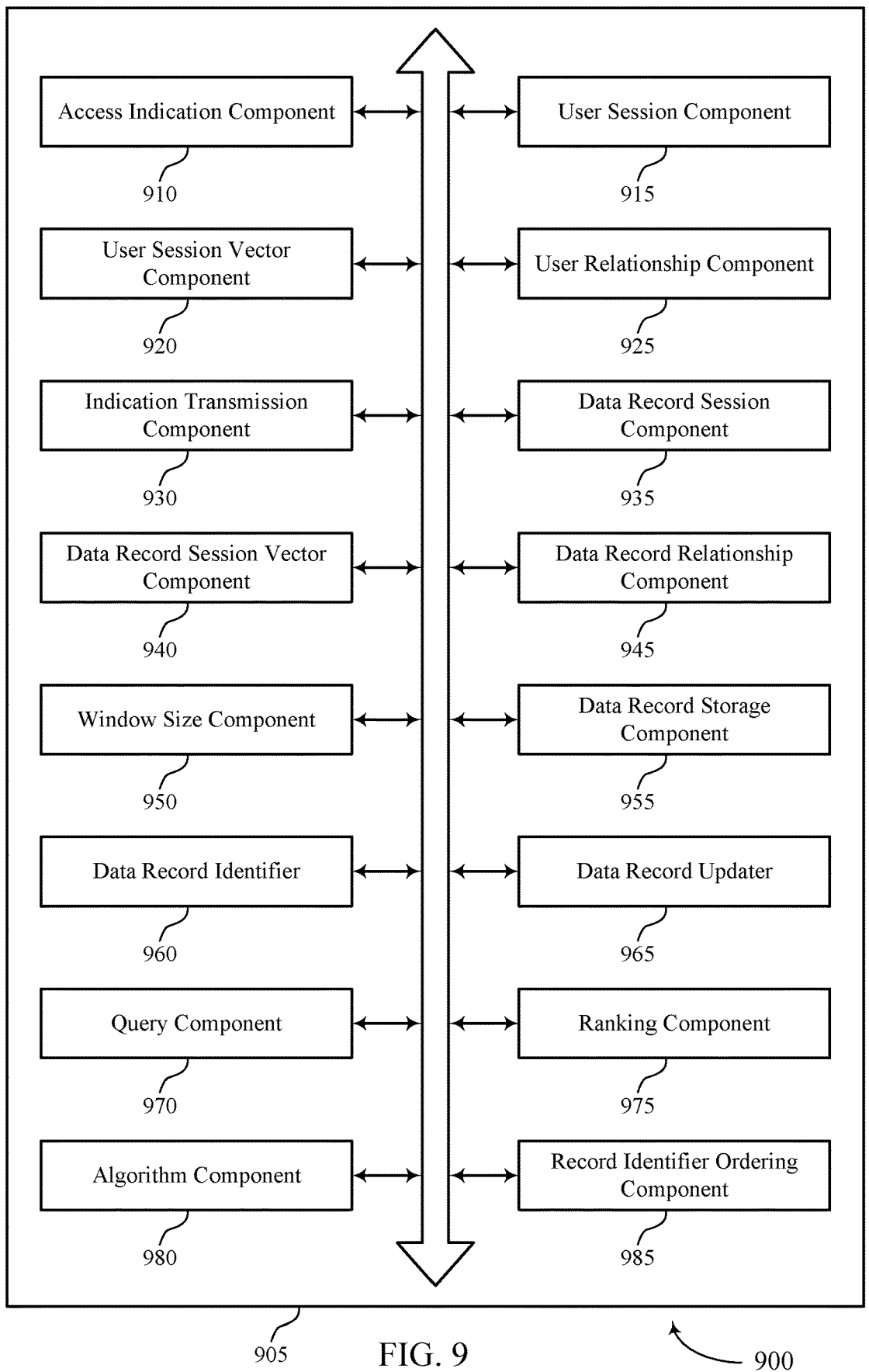
FIG. 9 shows a block diagram of a clustering manager that supports determining user and data record relationships based on vector space embeddings in accordance with aspects of the present disclosure.

FIG. 9 shows a block diagram 900 of a clustering manager 905 that supports determining user and data record relationships based on vector space embeddings in accordance with aspects of the present disclosure. The clustering manager 905 may be an example of aspects of a clustering manager 815 or a clustering manager 1010 described herein. The clustering manager 905 may include an access indication component 910, a user session component 915, a user session vector component 920, a user relationship component 925, an indication transmission component 930, a data record session component 935, a data record session vector component 940, a data record relationship component 945, a window size component 950, a data record storage component 955, a data record identifier 960, a data record updater 965, a query component 970, a ranking component 975, an algorithm component 980, and a record identifier ordering component 985. Each of these modules may communicate, directly or indirectly, with one another (e.g., via one or more buses).

The access indication component 910 may receive a set of data record access indications corresponding to a set of data records accessed by a set of users. In some examples, the access indication component 910 may retrieve, from a database storing a total set of data record access indications, a subset of the total set of data record access indications based on a threshold number of data record access indications for the subset, a threshold access time for the subset, or a combination thereof.

The user session component 915 may generate, based on the set of data record access indications, a set of user sessions for the set of users, where each user session corresponds to a respective user of the set of users and includes a record identifier associated with each data record accessed by the respective user. The user session vector component 920 may generate, in a vector space, a set of vectors from the set of user sessions using an embedding operation, where each vector of the set of vectors corresponds to a respective user of the set of users.

The user relationship component 925 may determine relationships between the set of users based on the set of vectors. In some examples, the user relationship component 925 may determine one or more groups of users from the set of users based on the set of vectors and may store, in a database, an indication of the one or more groups of users. In some examples, determining the one or more groups of users may involve the user relationship component 925 grouping vectors of the set of vectors based on a threshold distance between vectors in a group, a threshold number of users in the group, a threshold number of groups, or a combination thereof, where the one or more groups of users are determined based on the grouping. In some examples, the user relationship component 925 may determine the relationships between the set of users further based on information stored in a database for a set of user identifiers corresponding to the set of users. The indication transmission component 930 may transmit an indication of at least one data record based on the determined relationships between the set of users.

In some implementations, the vector space is a first vector space and the set of vectors is a first set of vectors. The data record session component 935 may generate, based on the set of data record access indications, a set of data record sessions for the set of data records, where each data record session corresponds to a respective data record of the set of data records and includes a user identifier associated with each user accessing the respective data record. The data record session vector component 940 may generate, in a second vector space, a second set of vectors from the set of data record sessions using an additional embedding operation, where each vector of the second set of vectors corresponds to a respective data record of the set of data records. The data record relationship component 945 may determine additional relationships between the set of data records based on the second set of vectors.

Additionally or alternatively, in some implementations, generating the set of user sessions for the set of users involves the user session component 915 generating a set of sessions for the set of users and the set of data records, where each session of the set of sessions corresponds to either a respective user of the set of users and includes a record identifier associated with each data record accessed by the respective user or a respective data record of the set of data records and includes a user identifier associated with each user accessing the respective data record. In some examples, generating the set of sessions may involve the user session component 915 generating a first session of the set of sessions corresponding to a first user by generating a first array including each record identifier associated with each data record accessed by the first user and periodically inserting a user identifier of the first user into the first array according to a window size. Furthermore, generating the set of sessions may involve the data record session component 935 generating a second session of the set of sessions corresponding to a first data record by generating a second array including each user identifier associated with each user accessing the first data record and periodically inserting a data record identifier of the first data record into the second array according to the window size. The window size component 950 may dynamically determine the window size based on the vector space, the relationships between the set of users, or a combination thereof. Generating, in the vector space, the set of vectors from the set of user sessions may involve the user session vector component 920 generating, in the vector space, a set of total vectors from the set of sessions using the embedding operation, where each vector of the set of total vectors corresponds to a respective user and data record set of the set of users and the set of data records.

In some examples, transmitting the indication of the at least one data record may involve the indication transmission component 930 transmitting, for display in a user interface of a user device operated by a user of the set of users, an indication of a set of data records for quick access by the user based on a set of vectors corresponding to the set of data records nearest to a vector corresponding to the user in the vector space.

The data record storage component 955 may store, in a local memory cache of a user device operated by a first user of the set of users, a set of most recently used data records for the first user, where a group of users of the one or more groups of users includes the first user. The data record identifier 960 may identify a data record accessed by a second user of the group of users and may update the set of most recently used data records for the first user stored in the local memory cache of the user device with the identified data record based on the group of users including both the first user and the second user.

The query component 970 may receive a search query from a first user of the set of users, where a group of users of the one or more groups of users includes the first user. The ranking component 975 may rank, in response to the search query, a set of search results and may modify the ranking based on a data record accessed by a second user of the group of users, where transmitting the indication of the at least one data record is in response to the search query and is further based on the modified ranking.

The algorithm component 980 may input the set of vectors into a machine learning algorithm and may determine a machine-learned algorithm for search ranking based on the inputting. In some examples, the query component 970 may receive a search query, and the ranking component 975 may rank, in response to the search query, a set of search results based on the machine-learned algorithm for search ranking, where transmitting the indication of the at least one data record is in response to the search query and is further based on the ranking.

The record identifier ordering component 985 may order each record identifier in each user session according to a timestamp at which the associated data record is accessed by the respective user.

Figure 10:
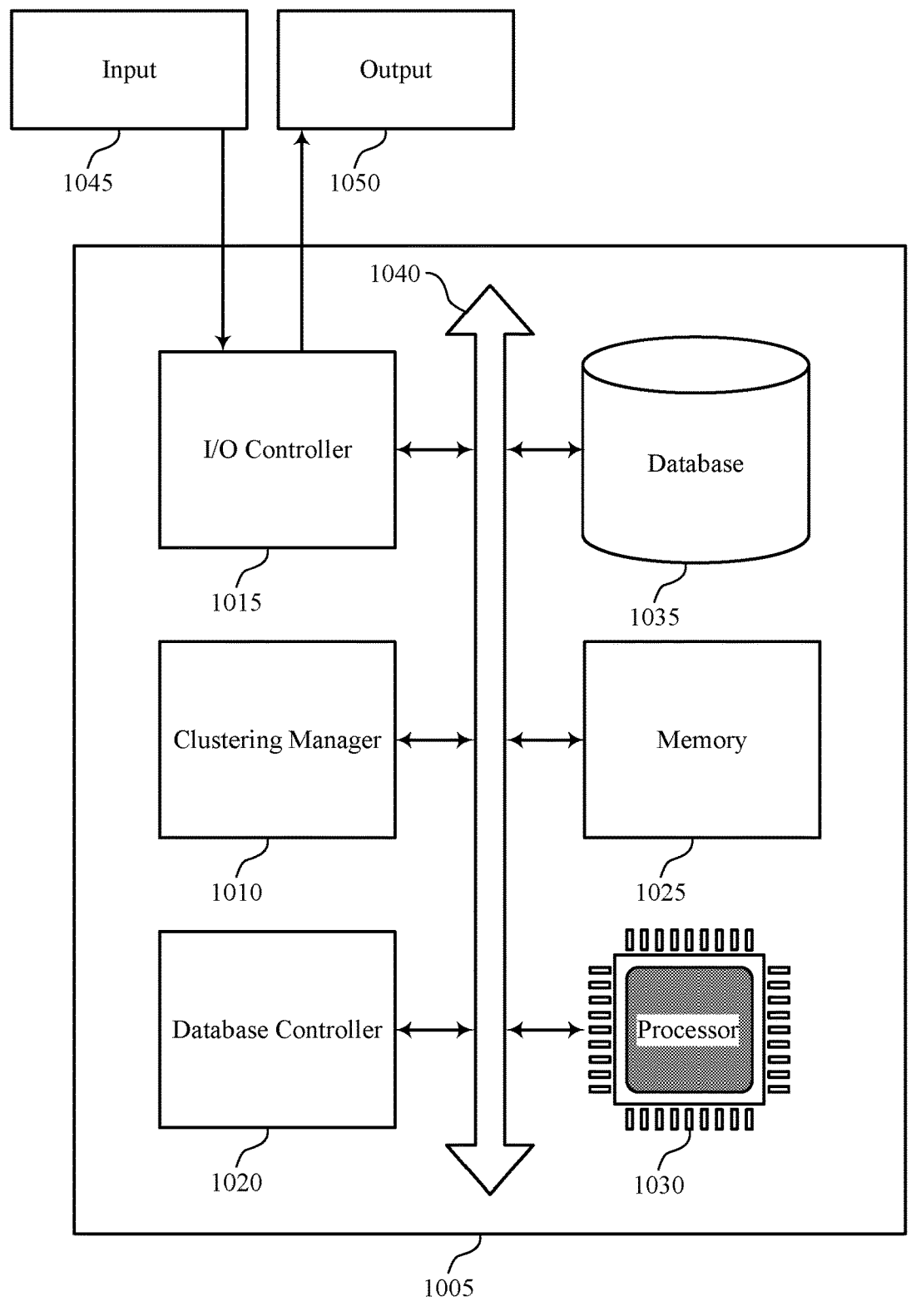
FIG. 10 shows a diagram of a system including a device that supports determining user and data record relationships based on vector space embeddings in accordance with aspects of the present disclosure.

FIG. 10 shows a diagram of a system 1000 including a device 1005 that supports determining user and data record relationships based on vector space embeddings in accordance with aspects of the present disclosure. The device 1005 may be an example of or include the components of a server (e.g., an application server) or an apparatus 805 as described herein. The device 1005 may include components for bi-directional data communications including components for transmitting and receiving communications, including a clustering manager 1010, an I/O controller 1015, a database controller 1020, memory 1025, a processor 1030, and a database 1035. These components may be in electronic communication via one or more buses (e.g., bus 1040).

The clustering manager 1010 may be an example of a clustering manager 815 or 905 as described herein. For example, the clustering manager 1010 may perform any of the methods or processes described herein with reference to FIGS. 8 and 9. In some cases, the clustering manager 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting determining user and data record relationships based on vector space embeddings).

Figure 11:
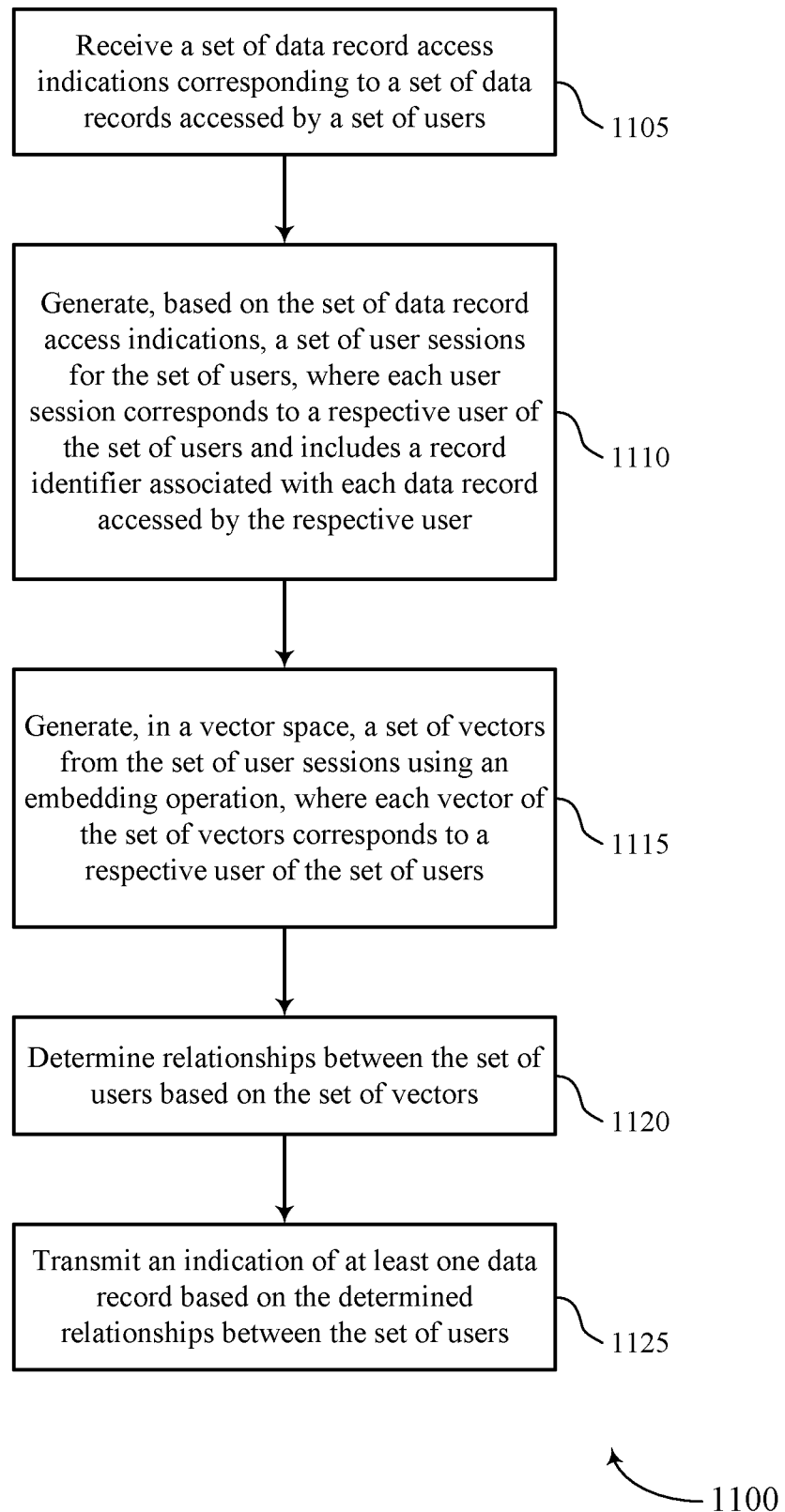
FIGS. 11 through 13 show flowcharts illustrating methods that support determining user and data record relationships based on vector space embeddings in accordance with aspects of the present disclosure.

FIG. 11 shows a flowchart illustrating a method 1100 that supports determining user and data record relationships based on vector space embeddings in accordance with aspects of the present disclosure. The operations of method 1100 may be implemented by an application server (e.g., a single server, a server cluster, a virtual machine, a container, or any other data processing device) or its components as described herein. For example, the operations of method 1100 may be performed by a clustering manager as described with reference to FIGS. 8 through 10. In some examples, an application server may execute a set of instructions to control the functional elements of the application server to perform the functions described herein. Additionally or alternatively, an application server may perform aspects of the functions described herein using special-purpose hardware.

At 1105, the application server may receive a set of data record access indications corresponding to a set of data records accessed by a set of users. The operations of 1105 may be performed according to the methods described herein. In some examples, aspects of the operations of 1105 may be performed by an access indication component as described with reference to FIGS. 8 through 10.

At 1110, the application server may generate, based on the set of data record access indications, a set of user sessions for the set of users, where each user session corresponds to a respective user of the set of users and includes a record identifier associated with each data record accessed by the respective user. The operations of 1110 may be performed according to the methods described herein. In some examples, aspects of the operations of 1110 may be performed by a user session component as described with reference to FIGS. 8 through 10.

At 1115, the application server may generate, in a vector space, a set of vectors from the set of user sessions using an embedding operation, where each vector of the set of vectors corresponds to a respective user of the set of users. The operations of 1115 may be performed according to the methods described herein. In some examples, aspects of the operations of 1115 may be performed by a user session vector component as described with reference to FIGS. 8 through 10.

At 1120, the application server may determine relationships between the set of users based on the set of vectors. The operations of 1120 may be performed according to the methods described herein. In some examples, aspects of the operations of 1120 may be performed by a user relationship component as described with reference to FIGS. 8 through 10.

At 1125, the application server may transmit an indication of at least one data record based on the determined relationships between the set of users. The operations of 1125 may be performed according to the methods described herein. In some examples, aspects of the operations of 1125 may be performed by an indication transmission component as described with reference to FIGS. 8 through 10.

Figure 12:
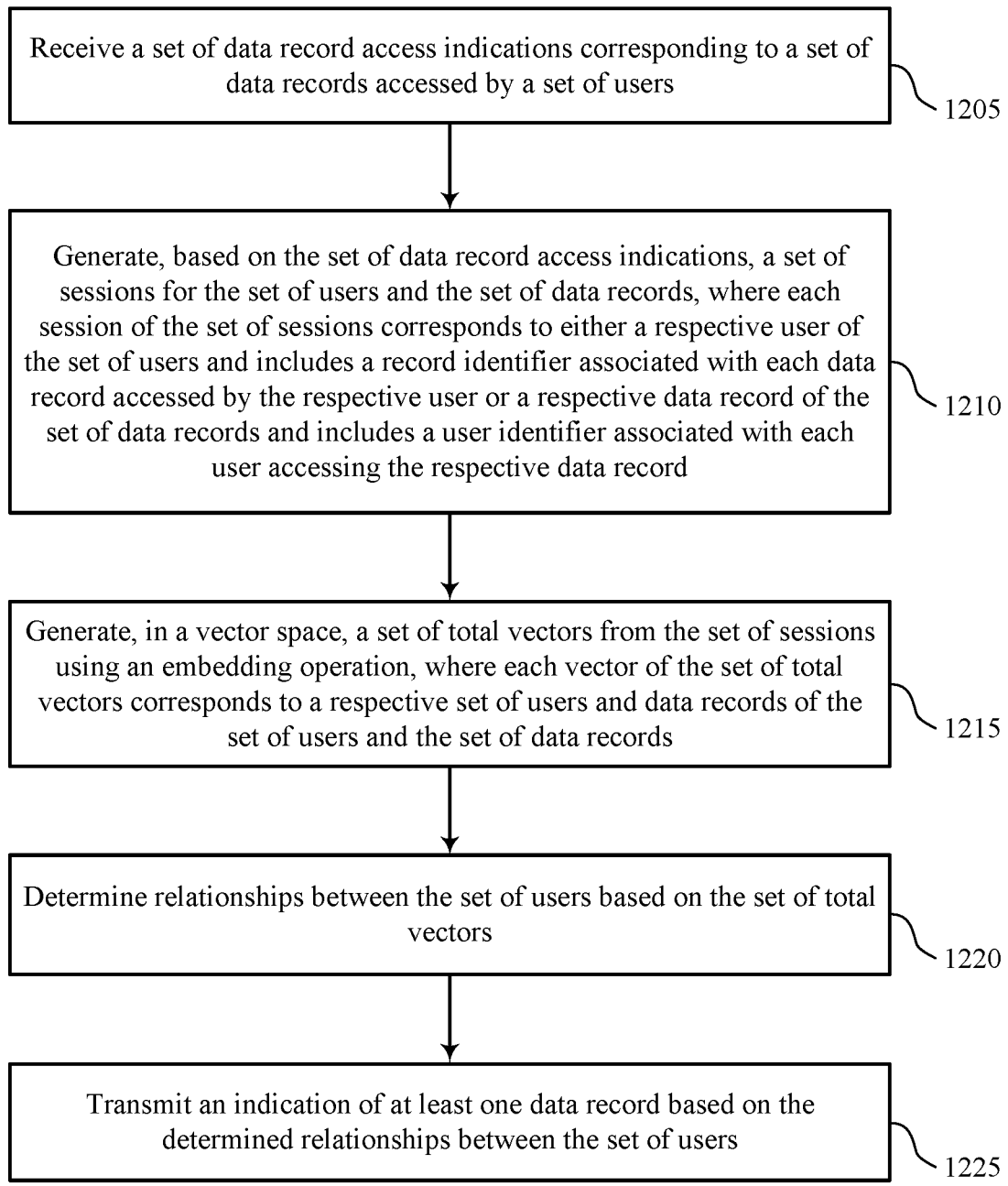

FIG. 12 shows a flowchart illustrating a method 1200 that supports determining user and data record relationships based on vector space embeddings in accordance with aspects of the present disclosure. The operations of method 1200 may be implemented by an application server (e.g., a single server, a server cluster, a virtual machine, a container, or any other data processing device) or its components as described herein. For example, the operations of method 1200 may be performed by a clustering manager as described with reference to FIGS. 8 through 10. In some examples, an application server may execute a set of instructions to control the functional elements of the application server to perform the functions described herein. Additionally or alternatively, an application server may perform aspects of the functions described herein using special-purpose hardware.

At 1205, the application server may receive a set of data record access indications corresponding to a set of data records accessed by a set of users. The operations of 1205 may be performed according to the methods described herein. In some examples, aspects of the operations of 1205 may be performed by an access indication component as described with reference to FIGS. 8 through 10.

At 1210, the application server may generate, based on the set of data record access indications, a set of sessions for the set of users and the set of data records, where each session of the set of sessions corresponds to either a respective user of the set of users and includes a record identifier associated with each data record accessed by the respective user or a respective data record of the set of data records and includes a user identifier associated with each user accessing the respective data record. The operations of 1210 may be performed according to the methods described herein. In some examples, aspects of the operations of 1210 may be performed by a user session component as described with reference to FIGS. 8 through 10.

At 1215, the application server may generate, in a vector space, a set of total vectors for the set of sessions using an embedding operation, where each vector of the set of total vectors corresponds to a respective set of users and data records of the set of users and the set of data records. The operations of 1215 may be performed according to the methods described herein. In some examples, aspects of the operations of 1215 may be performed by a user session vector component as described with reference to FIGS. 8 through 10.

At 1220, the application server may determine relationships between the set of users based on the set of total vectors. The operations of 1220 may be performed according to the methods described herein. In some examples, aspects of the operations of 1220 may be performed by a user relationship component as described with reference to FIGS. 8 through 10.

At 1225, the application server may transmit an indication of at least one data record based on the determined relationships between the set of users. The operations of 1225 may be performed according to the methods described herein. In some examples, aspects of the operations of 1225 may be performed by an indication transmission component as described with reference to FIGS. 8 through 10.

Figure 13:
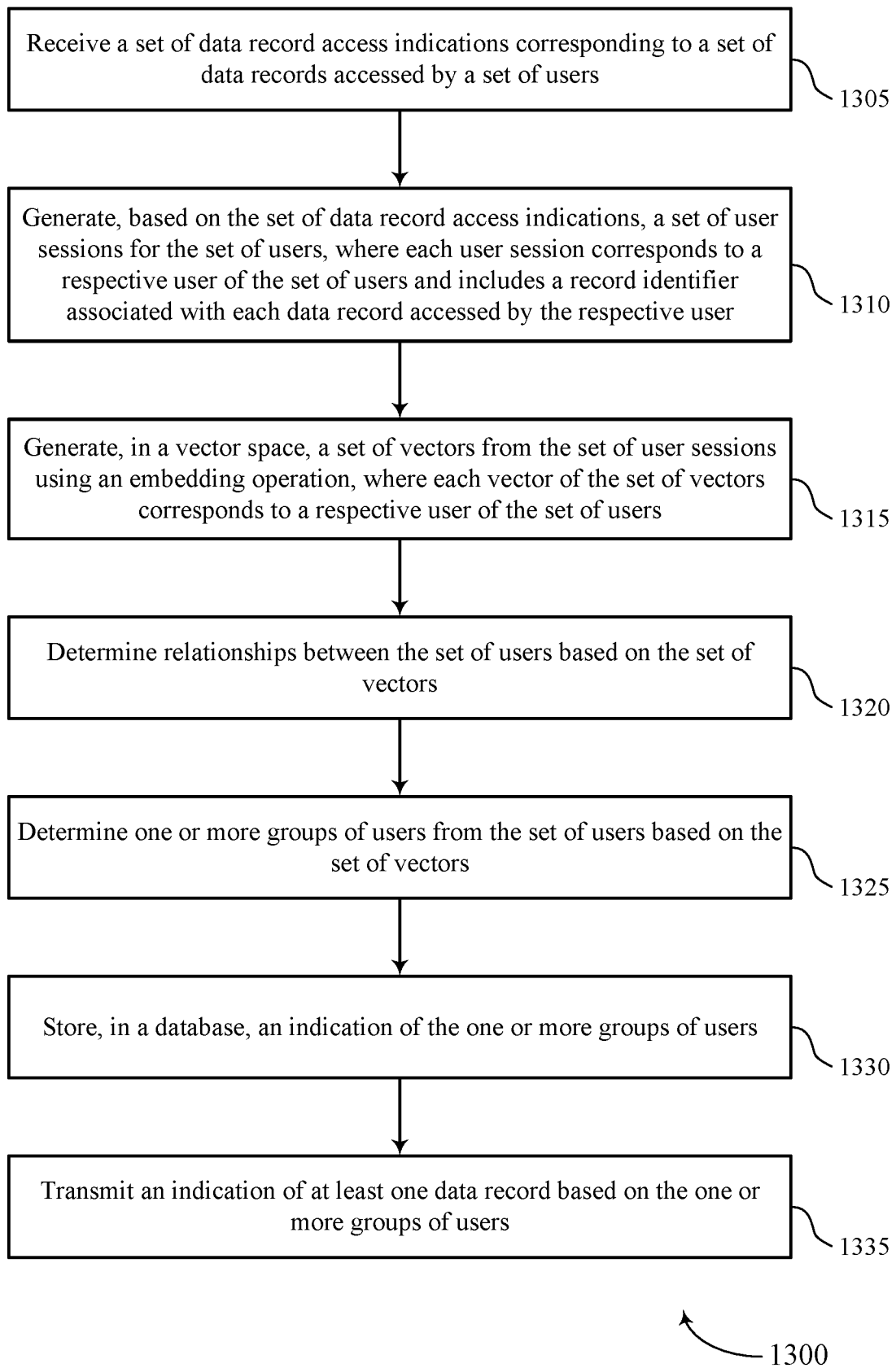

FIG. 13 shows a flowchart illustrating a method 1300 that supports determining user and data record relationships based on vector space embeddings in accordance with aspects of the present disclosure. The operations of method 1300 may be implemented by an application server (e.g., a single server, a server cluster, a virtual machine, a container, or any other data processing device) or its components as described herein. For example, the operations of method 1300 may be performed by a clustering manager as described with reference to FIGS. 8 through 10. In some examples, an application server may execute a set of instructions to control the functional elements of the application server to perform the functions described herein. Additionally or alternatively, an application server may perform aspects of the functions described herein using special-purpose hardware.

At 1305, the application server may receive a set of data record access indications corresponding to a set of data records accessed by a set of users. The operations of 1305 may be performed according to the methods described herein. In some examples, aspects of the operations of 1305 may be performed by an access indication component as described with reference to FIGS. 8 through 10.

At 1310, the application server may generate, based on the set of data record access indications, a set of user sessions for the set of users, where each user session corresponds to a respective user of the set of users and includes a record identifier associated with each data record accessed by the respective user. The operations of 1310 may be performed according to the methods described herein. In some examples, aspects of the operations of 1310 may be performed by a user session component as described with reference to FIGS. 8 through 10.

At 1315, the application server may generate, in a vector space, a set of vectors from the set of user sessions using an embedding operation, where each vector of the set of vectors corresponds to a respective user of the set of users. The operations of 1315 may be performed according to the methods described herein. In some examples, aspects of the operations of 1315 may be performed by a user session vector component as described with reference to FIGS. 8 through 10.

At 1320, the application server may determine relationships between the set of users based on the set of vectors. The operations of 1320 may be performed according to the methods described herein. In some examples, aspects of the operations of 1320 may be performed by a user relationship component as described with reference to FIGS. 8 through 10.

At 1325, the application server may determine one or more groups of users from the set of users based on the set of vectors. The operations of 1325 may be performed according to the methods described herein. In some examples, aspects of the operations of 1325 may be performed by a user relationship component as described with reference to FIGS. 8 through 10.

At 1330, the application server may store, in a database, an indication of the one or more groups of users. The operations of 1330 may be performed according to the methods described herein. In some examples, aspects of the operations of 1330 may be performed by a user relationship component as described with reference to FIGS. 8 through 10.

At 1335, the application server may transmit an indication of at least one data record based on the one or more groups of users. The operations of 1335 may be performed according to the methods described herein. In some examples, aspects of the operations of 1335 may be performed by an indication transmission component as described with reference to FIGS. 8 through 10.

A method for relating users and data records is described. The method may include receiving a set of data record access indications corresponding to a set of data records accessed by a set of users, generating, based on the set of data record access indications, a set of user sessions for the set of users, where each user session corresponds to a respective user of the set of users and includes a record identifier associated with each data record accessed by the respective user, generating, in a vector space, a set of vectors from the set of user sessions using an embedding operation, where each vector of the set of vectors corresponds to a respective user of the set of users, determining relationships between the set of users based on the set of vectors, and transmitting an indication of at least one data record based on the determined relationships between the set of users.

An apparatus for relating users and data records is described. The apparatus may include a processor, memory coupled with the processor, and instructions stored in the memory. The instructions may be executable by the processor to cause the apparatus to receive a set of data record access indications corresponding to a set of data records accessed by a set of users, generate, based on the set of data record access indications, a set of user sessions for the set of users, where each user session corresponds to a respective user of the set of users and includes a record identifier associated with each data record accessed by the respective user, generate, in a vector space, a set of vectors from the set of user sessions using an embedding operation, where each vector of the set of vectors corresponds to a respective user of the set of users, determine relationships between the set of users based on the set of vectors, and transmit an indication of at least one data record based on the determined relationships between the set of users.

Another apparatus for relating users and data records is described. The apparatus may include means for receiving a set of data record access indications corresponding to a set of data records accessed by a set of users, generating, based on the set of data record access indications, a set of user sessions for the set of users, where each user session corresponds to a respective user of the set of users and includes a record identifier associated with each data record accessed by the respective user, generating, in a vector space, a set of vectors from the set of user sessions using an embedding operation, where each vector of the set of vectors corresponds to a respective user of the set of users, determining relationships between the set of users based on the set of vectors, and transmitting an indication of at least one data record based on the determined relationships between the set of users.

A non-transitory computer-readable medium storing code for relating users and data records is described. The code may include instructions executable by a processor to receive a set of data record access indications corresponding to a set of data records accessed by a set of users, generate, based on the set of data record access indications, a set of user sessions for the set of users, where each user session corresponds to a respective user of the set of users and includes a record identifier associated with each data record accessed by the respective user, generate, in a vector space, a set of vectors from the set of user sessions using an embedding operation, where each vector of the set of vectors corresponds to a respective user of the set of users, determine relationships between the set of users based on the set of vectors, and transmit an indication of at least one data record based on the determined relationships between the set of users.

In some examples of the method, apparatuses, and non-transitory computer-readable medium described herein, the vector space is a first vector space and the set of vectors is a first set of vectors. Some examples of the method, apparatuses, and non-transitory computer-readable medium described herein may further include operations, features, means, or instructions for generating, based on the set of data record access indications, a set of data record sessions for the set of data records, where each data record session corresponds to a respective data record of the set of data records and includes a user identifier associated with each user accessing the respective data record, generating, in a second vector space, a second set of vectors from the set of data record sessions using an additional embedding operation, where each vector of the second set of vectors corresponds to a respective data record of the set of data records, and determining additional relationships between the set of data records based on the second set of vectors.

In some examples of the method, apparatuses, and non-transitory computer-readable medium described herein, generating the set of user sessions for the set of users may include operations, features, means, or instructions for generating a set of sessions for the set of users and the set of data records, where each session of the set of sessions corresponds to either a respective user of the set of users and includes a record identifier associated with each data record accessed by the respective user or a respective data record of the set of data records and includes a user identifier associated with each user accessing the respective data record. In some examples of the method, apparatuses, and non-transitory computer-readable medium described herein, generating, in the vector space, the set of vectors from the set of user sessions may include operations, features, means, or instructions for generating, in the vector space, a set of total vectors for the set of users and data records of the set of users and the set of data records using the embedding operation, where each vector of the set of total vectors corresponds to a respective set of users and data records of the set of users and the set of data records.

In some examples of the method, apparatuses, and non-transitory computer-readable medium described herein, generating the set of sessions further may include operations, features, means, or instructions for generating a first session of the set of sessions corresponding to a first user by generating a first array including each record identifier associated with each data record accessed by the first user and periodically inserting a user identifier of the first user into the first array according to a window size and generating a second session of the set of sessions corresponding to a first data record by generating a second array including each user identifier associated with each user accessing the first data record and periodically inserting a data record identifier of the first data record into the second array according to the window size.

Some examples of the method, apparatuses, and non-transitory computer-readable medium described herein may further include operations, features, means, or instructions for dynamically determining the window size based on the vector space, the relationships between the set of users, or a combination thereof.

In some examples of the method, apparatuses, and non-transitory computer-readable medium described herein, transmitting the indication of the at least one data record further may include operations, features, means, or instructions for transmitting, for display in a user interface of a user device operated by a user of the set of users, an indication of a set of data records for quick access by the user based on a set of vectors corresponding to the set of data records nearest to a vector corresponding to the user in the vector space.

In some examples of the method, apparatuses, and non-transitory computer-readable medium described herein, determining the relationships may include operations, features, means, or instructions for determining one or more groups of users from the set of users based on the set of vectors and storing, in a database, an indication of the one or more groups of users.

In some examples of the method, apparatuses, and non-transitory computer-readable medium described herein, determining the one or more groups of users may include operations, features, means, or instructions for grouping vectors of the set of vectors based on a threshold distance between vectors in a group, a threshold number of users in the group, a threshold number of groups, or a combination thereof, where the one or more groups of users may be determined based on the grouping.

Some examples of the method, apparatuses, and non-transitory computer-readable medium described herein may further include operations, features, means, or instructions for storing, in a local memory cache of a user device operated by a first user of the set of users, a set of most recently used data records for the first user, where a group of users of the one or more groups of users includes the first user, identifying a data record accessed by a second user of the group of users, and updating the set of most recently used data records for the first user stored in the local memory cache of the user device with the identified data record based on the group of users including both the first user and the second user.

Some examples of the method, apparatuses, and non-transitory computer-readable medium described herein may further include operations, features, means, or instructions for receiving a search query from a first user of the set of users, where a group of users of the one or more groups of users includes the first user, ranking, in response to the search query, a set of search results, and modifying the ranking based on a data record accessed by a second user of the group of users, where transmitting the indication of the at least one data record may be in response to the search query and may be further based on the modified ranking.

Some examples of the method, apparatuses, and non-transitory computer-readable medium described herein may further include operations, features, means, or instructions for inputting the set of vectors into a machine learning algorithm, determining a machine-learned algorithm for search ranking based on the inputting, receiving a search query, and ranking, in response to the search query, a set of search results based on the machine-learned algorithm for search ranking, where transmitting the indication of the at least one data record may be in response to the search query and may be further based on the ranking.

Some examples of the method, apparatuses, and non-transitory computer-readable medium described herein may further include operations, features, means, or instructions for ordering each record identifier in each user session according to a timestamp at which the associated data record may be accessed by the respective user.

In some examples of the method, apparatuses, and non-transitory computer-readable medium described herein, determining the relationships further may include operations, features, means, or instructions for determining the relationships between the set of users further based on information stored in a database for a set of user identifiers corresponding to the set of users.

In some examples of the method, apparatuses, and non-transitory computer-readable medium described herein, receiving the set of data record access indications may include operations, features, means, or instructions for retrieving, from a database storing a total set of data record access indications, a subset of the total set of data record access indications based on a threshold number of data record access indications for the subset, a threshold access time for the subset, or a combination thereof.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for relating users and data records, comprising:
    receiving a plurality of data record access indications corresponding to a plurality of data records accessed by a plurality of users;
    generating, based at least in part on the plurality of data record access indications, a plurality of user sessions for the plurality of users,
    wherein each user session corresponds to a respective user of the plurality of users and comprises a record identifier associated with each data record accessed by the respective user,
    wherein generating a first user session of the plurality of user sessions comprises:
    generating a first array comprising record identifiers associated with data records accessed by a first user and periodically inserting a user identifier for the first user into the first array according to a window size;
    generating, in a vector space, a plurality of vectors from the plurality of user sessions using an embedding operation,
    wherein each vector of the plurality of vectors corresponds to a respective user of the plurality of users;
    determining, based at least in part on a distance between vectors of the plurality of vectors corresponding to the respective users of the plurality of users and the plurality of data record access indications, at least one group of users of the plurality of users; and
    transmitting, to a user that is classified in the at least one group, an indication of at least one data record, wherein the at least one data record is identified in accordance with the user being classified in the at least one group and using the plurality of vectors.

2. The method of claim 1, wherein the vector space comprises a first vector space and the plurality of vectors comprises a first plurality of vectors, the method further comprising:
    generating, based at least in part on the plurality of data record access indications, a plurality of data record sessions for the plurality of data records, wherein each data record session corresponds to a respective data record of the plurality of data records and comprises a user identifier associated with each user accessing the respective data record;
    generating, in a second vector space, a second plurality of vectors from the plurality of data record sessions using an additional embedding operation, wherein each vector of the second plurality of vectors corresponds to a respective data record of the plurality of data records; and determining additional relationships between the plurality of data records based at least in part on the second plurality of vectors.

3. The method of claim 1, wherein:

generating the plurality of user sessions for the plurality of users comprises:

generating a plurality of sessions for the plurality of users and the plurality of data records, wherein each session of the plurality of sessions corresponds to either a respective user of the plurality of users and comprises a record identifier associated with each data record accessed by the respective user or a respective data record of the plurality of data records and comprises a user identifier associated with each user accessing the respective data record; and generating, in the vector space, the plurality of vectors from the plurality of user sessions comprises:

generating, in the vector space, a plurality of total vectors for the plurality of sessions using the embedding operation, wherein each vector of the plurality of total vectors corresponds to a respective plurality of users and data records.

4. The method of claim 3, wherein generating the plurality of sessions further comprises:

generating a second session of the plurality of sessions corresponding to a first data record by generating a second array comprising each user identifier associated with each user accessing the first data record and periodically inserting a data record identifier of the first data record into the second array according to the window size.

5. The method of claim 4, further comprising:

dynamically determining the window size based at least in part on the vector space, relationships between the plurality of users, or a combination thereof.

6. The method of claim 3, wherein transmitting the indication of the at least one data record further comprises:

transmitting, for display in a user interface of a user device operated by a user of the plurality of users, an indication of a set of data records for quick access by the user based at least in part on a set of vectors corresponding to a set of data records nearest to a vector corresponding to the user in the vector space.

7. The method of claim 1, wherein determining the relationships comprises:

determining one or more groups of users from the plurality of users based at least in part on the plurality of vectors; and storing, in a database, an indication of the one or more groups of users.

8. The method of claim 7, wherein determining the one or more groups of users comprises:

grouping vectors of the plurality of vectors based at least in part on a threshold distance between vectors in a group, a threshold number of users in the group, a threshold number of groups, or a combination thereof, wherein the one or more groups of users are determined based at least in part on the grouping.

9. The method of claim 7, further comprising:

storing, in a local memory cache of a user device operated by a first user of the plurality of users, a set of most recently used data records for the first user, wherein a group of users of the one or more groups of users comprises the first user;

identifying a data record accessed by a second user of the group of users; and updating the set of most recently used data records for the first user stored in the local memory cache of the user device with the identified data record based at least in part on the group of users comprising both the first user and the second user.

10. The method of claim 7, further comprising:

receiving a search query from a first user of the plurality of users, wherein a group of users of the one or more groups of users comprises the first user;

ranking, in response to the search query, a set of search results; and modifying the ranking based at least in part on a data record accessed by a second user of the group of users, wherein transmitting the indication of the at least one data record is in response to the search query and is further based at least in part on the modified ranking.

11. The method of claim 1, further comprising:

inputting the plurality of vectors into a machine learning algorithm;

determining a machine-learned algorithm for search ranking based at least in part on the inputting;

receiving a search query; and ranking, in response to the search query, a set of search results based at least in part on the machine-learned algorithm for search ranking, wherein transmitting the indication of the at least one data record is in response to the search query and is further based at least in part on the ranking.

12. The method of claim 1, further comprising:

ordering each record identifier in each user session according to a timestamp at which the associated data record is accessed by the respective user.

13. The method of claim 1, wherein determining the at least one group of users further comprises:

determining relationships between the plurality of users based at least in part on information stored in a database for a plurality of user identifiers corresponding to the plurality of users.

14. The method of claim 1, wherein receiving the plurality of data record access indications comprises:

retrieving, from a database storing a total set of data record access indications, a subset of the total set of data record access indications based at least in part on a threshold number of data record access indications for the subset, a threshold access time for the subset, or a combination thereof.

15. An apparatus for relating users and data records, comprising: a processor; memory coupled with the processor; and instructions stored in the memory and executable by the processor to cause the apparatus to:

receive a plurality of data record access indications corresponding to a plurality of data records accessed by a plurality of users;

generate, based at least in part on the plurality of data record access indications, a plurality of user sessions for the plurality of users, wherein each user session corresponds to a respective user of the plurality of users and comprises a record identifier associated with each data record accessed by the respective user, wherein to generate a first user session of the plurality of user sessions, the instructions are executable by the processor to cause the apparatus to:

generate a first array comprising record identifiers associated with data records accessed by a first user and periodically inserting a user identifier for the first user into the first array according to a window size;

generate, in a vector space, a plurality of vectors from the plurality of user sessions using an embedding operation, wherein each vector of the plurality of vectors corresponds to a respective user of the plurality of users;

determine, based at least in part on a distance between vectors of the plurality of vectors corresponding to the respective users of the plurality of users and the plurality of data record access indications, at least one group of users of the plurality of users; and transmit, to a user that is classified in the at least one group, an indication of at least one data record, wherein the at least one data record is identified in accordance with the user being classified in the at least one group and using the plurality of vectors.

16. The apparatus of claim 15, wherein the vector space comprises a first vector space, the plurality of vectors comprises a first plurality of vectors, and the instructions are further executable by the processor to cause the apparatus to:

generate, based at least in part on the plurality of data record access indications, a plurality of data record sessions for the plurality of data records, wherein each data record session corresponds to a respective data record of the plurality of data records and comprises a user identifier associated with each user accessing the respective data record;

generate, in a second vector space, a second plurality of vectors from the plurality of data record sessions using an additional embedding operation, wherein each vector of the second plurality of vectors corresponds to a respective data record of the plurality of data records; and determine additional relationships between the plurality of data records based at least in part on the second plurality of vectors.

17. The apparatus of claim 15, wherein:

the instructions to generate the plurality of user sessions for the plurality of users are executable by the processor to cause the apparatus to:

generate a plurality of sessions for the plurality of users and the plurality of data records, wherein each session of the plurality of sessions corresponds to either a respective user of the plurality of users and comprises a record identifier associated with each data record accessed by the respective user or a respective data record of the plurality of data records and comprises a user identifier associated with each user accessing the respective data record; and the instructions to generate, in the vector space, the plurality of vectors from the plurality of user sessions are executable by the processor to cause the apparatus to:

generate, in the vector space, a plurality of total vectors from the plurality of sessions using the embedding operation, wherein each vector of the plurality of total vectors corresponds to a respective plurality of users and data records.

18. The apparatus of claim 17, wherein the instructions to generate the plurality of sessions further are executable by the processor to cause the apparatus to:

generate a second session of the plurality of sessions corresponding to a first data record by generating a second array comprising each user identifier associated with each user accessing the first data record and periodically inserting a data record identifier of the first data record into the second array according to the window size.

19. The apparatus of claim 15, wherein the instructions to determine the at least one group are executable by the processor to cause the apparatus to:

determine one or more groups of users from the plurality of users based at least in part on the plurality of vectors; and store, in a database, an indication of the one or more groups of users.

20. A non-transitory computer-readable medium storing code for relating users and data records, the code comprising instructions executable by a processor to:

receive a plurality of data record access indications corresponding to a plurality of data records accessed by a plurality of users;

generate, based at least in part on the plurality of data record access indications, a plurality of user sessions for the plurality of users, wherein each user session corresponds to a respective user of the plurality of users and comprises a record identifier associated with each data record accessed by the respective user, wherein to generate a first user session of the plurality of user sessions, the instructions are executable by the processor to:

generate a first array comprising record identifiers associated with data records accessed by a first user and periodically inserting a user identifier for the first user into the first array according to a window size;

generate, in a vector space, a plurality of vectors from the plurality of user sessions using an embedding operation, wherein each vector of the plurality of vectors corresponds to a respective user of the plurality of users;

determine, based at least in part on a distance between vectors of the plurality of vectors corresponding to the respective users of the plurality of users and the plurality of data record access indications, at least one group of users of the plurality of users based; and transmit, to a user that is classified in the at least one group, an indication of at least one data record, wherein the at least one data record is identified in accordance with the user being classified in the at least one group and using the plurality of vectors.

* * * * *